United States Patent
Schultz et al.

(10) Patent No.: US 7,171,769 B2
(45) Date of Patent: Feb. 6, 2007

(54) HITCH SYSTEM USING A VIDEO CAMERA TO FACILITATE HITCH ALIGNMENT

(75) Inventors: Lynn W. Schultz, Campbellsport, WI (US); Timothy G. Koch, Slinger, WI (US); Terry C. Wendorff, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 181 days.

(21) Appl. No.: 10/777,824

(22) Filed: Feb. 12, 2004

(65) Prior Publication Data

US 2005/0193603 A1  Sep. 8, 2005

(51) Int. Cl.
*E01H 5/04* (2006.01)

(52) U.S. Cl. .......................... 37/231; 37/906; 172/272; 348/119

(58) Field of Classification Search ................. 37/231, 37/232, 234, 906; 172/677, 439, 272–275; 348/118–120
See application file for complete search history.

(56) References Cited

U.S. PATENT DOCUMENTS

| | | | | |
|---|---|---|---|---|
| 5,191,328 A | * | 3/1993 | Nelson ................. | 340/870.06 |
| 5,215,423 A | * | 6/1993 | Schulte-Hinsken et al. | 414/408 |
| 5,274,432 A | * | 12/1993 | Parent .................. | 356/138 |
| 5,452,982 A | * | 9/1995 | Engle ................... | 414/333 |
| 5,650,764 A | * | 7/1997 | McCullough ............ | 340/431 |
| 5,894,688 A | | 4/1999 | Struck et al. | |
| 5,947,637 A | * | 9/1999 | Neuling ................. | 404/94 |
| 6,100,795 A | * | 8/2000 | Otterbacher et al. ..... | 340/431 |
| 6,222,457 B1 | * | 4/2001 | Mills et al. ............ | 340/686.1 |
| 6,581,695 B2 | * | 6/2003 | Bernhardt et al. ....... | 172/439 |
| 6,765,607 B2 | * | 7/2004 | Mizusawa et al. ....... | 348/118 |
| 6,769,709 B1 | * | 8/2004 | Piper et al. ............ | 280/477 |
| 2002/0149673 A1 | * | 10/2002 | Hirama et al. .......... | 348/118 |
| 2002/0154005 A1 | * | 10/2002 | Wall et al. ............. | 340/431 |
| 2003/0234512 A1 | * | 12/2003 | Holub ................... | 280/432 |
| 2004/0006894 A1 | | 1/2004 | Schultz et al. | |

* cited by examiner

*Primary Examiner*—Thomas A Beach
(74) *Attorney, Agent, or Firm*—Reinhart Boerner Van Deuren s.c.

(57) ABSTRACT

A video monitoring system is disclosed which may be used by the operator of a vehicle to guide the approach of the vehicle to an implement or a trailer or the like to bring connecting members of a hitch mechanism respectively located on the vehicle and on the implement or trailer into alignment and engagement with each other. A video camera is installed onto either the vehicle in the closest possible proximity to the hitch latching mechanism and is directed toward an alignment indicia located on the implement or trailer. A video monitor in the cab of the vehicle displays the video image "seen" by the video camera of the alignment indicia, allowing the vehicle to be driven into a position in which the implement or trailer may be hitched to the vehicle.

28 Claims, 17 Drawing Sheets

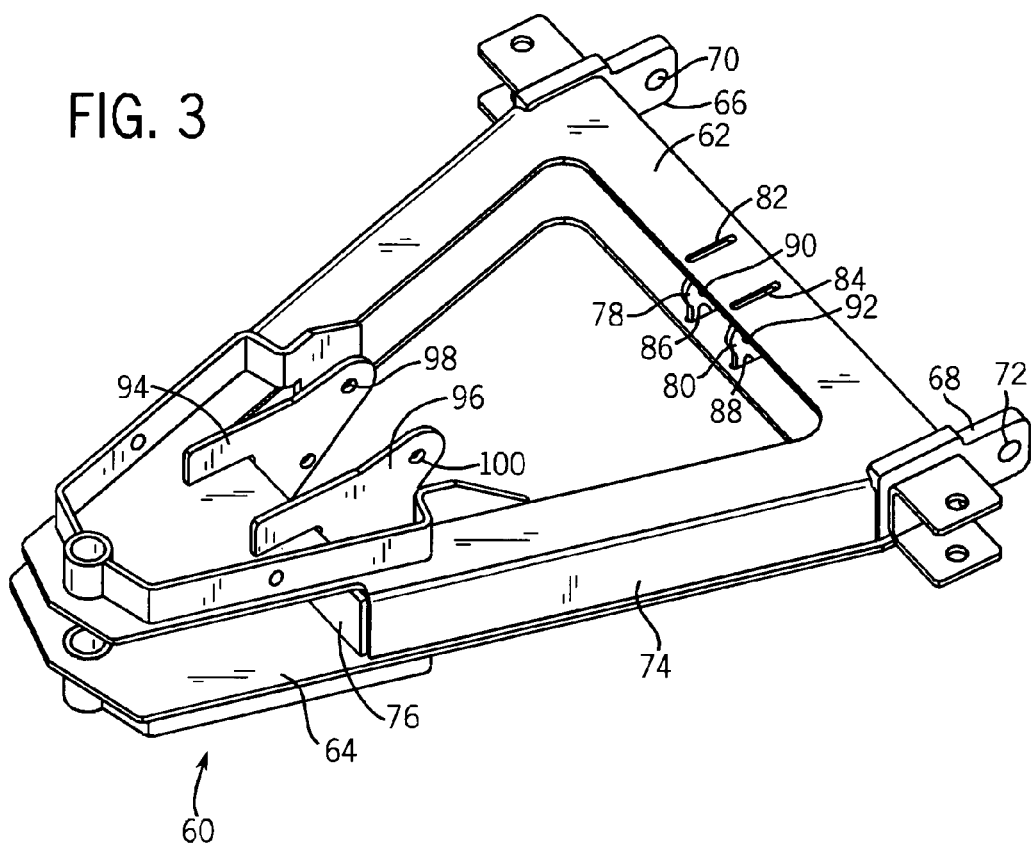

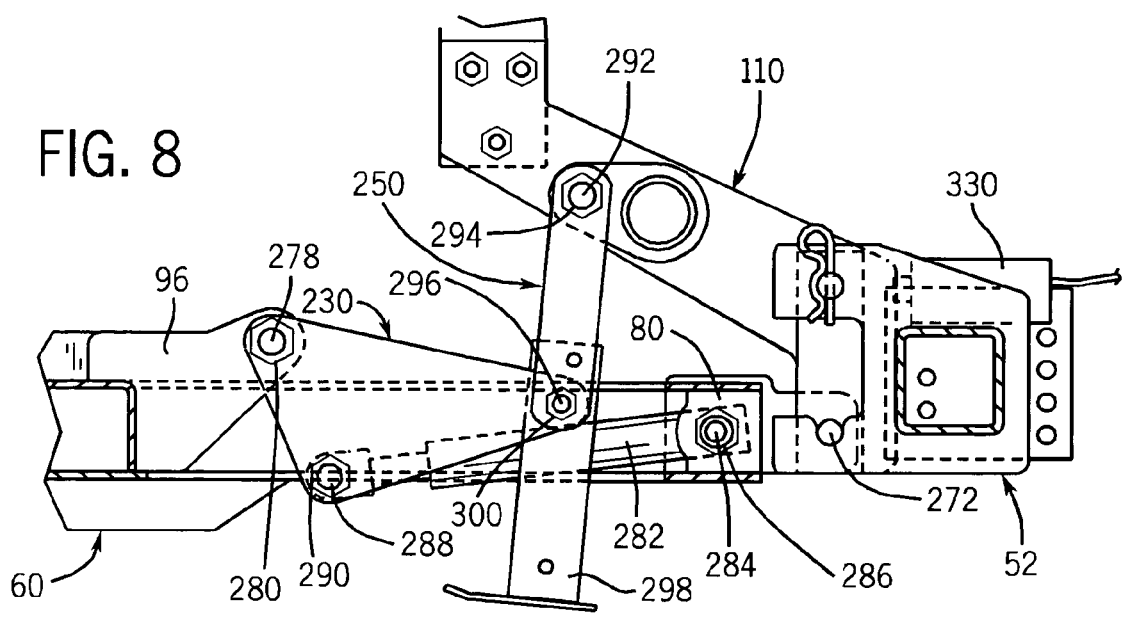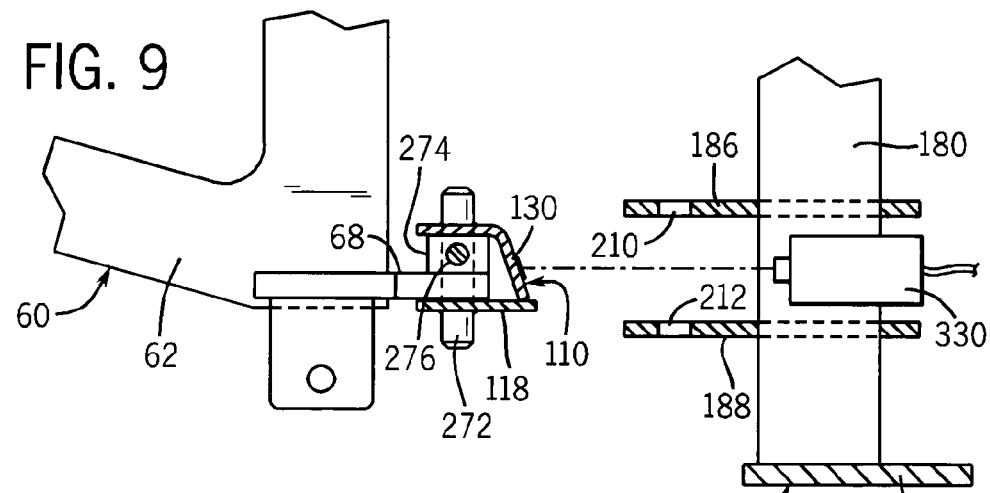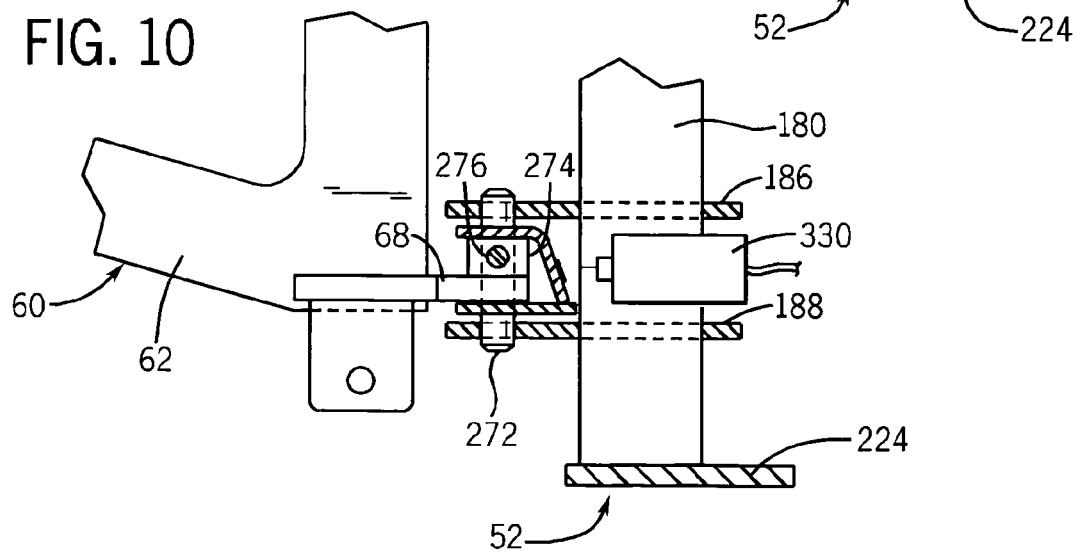

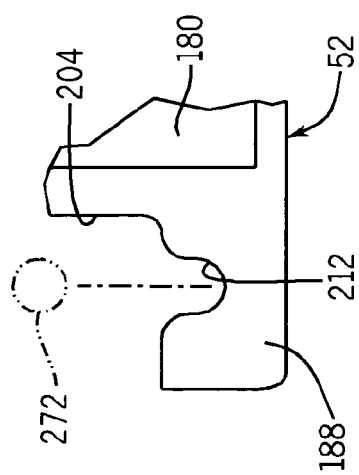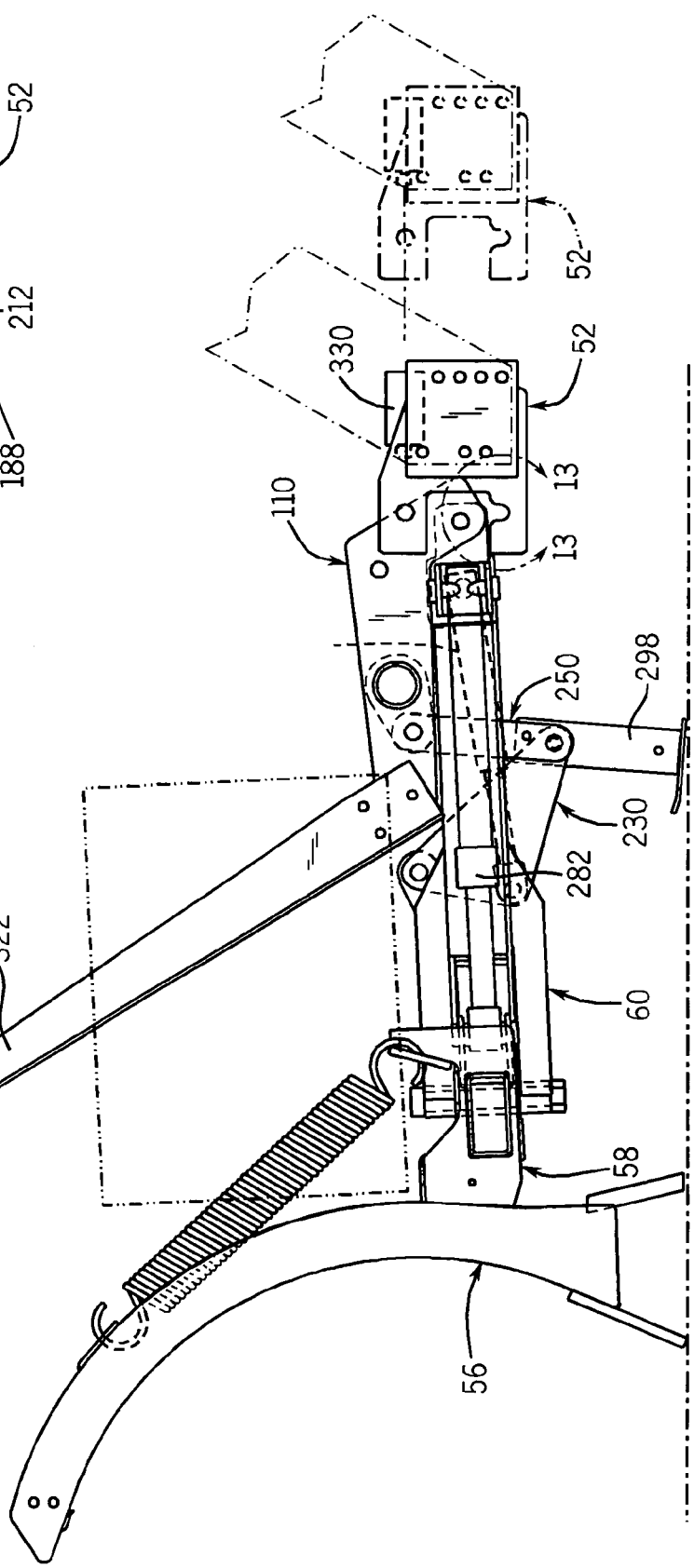

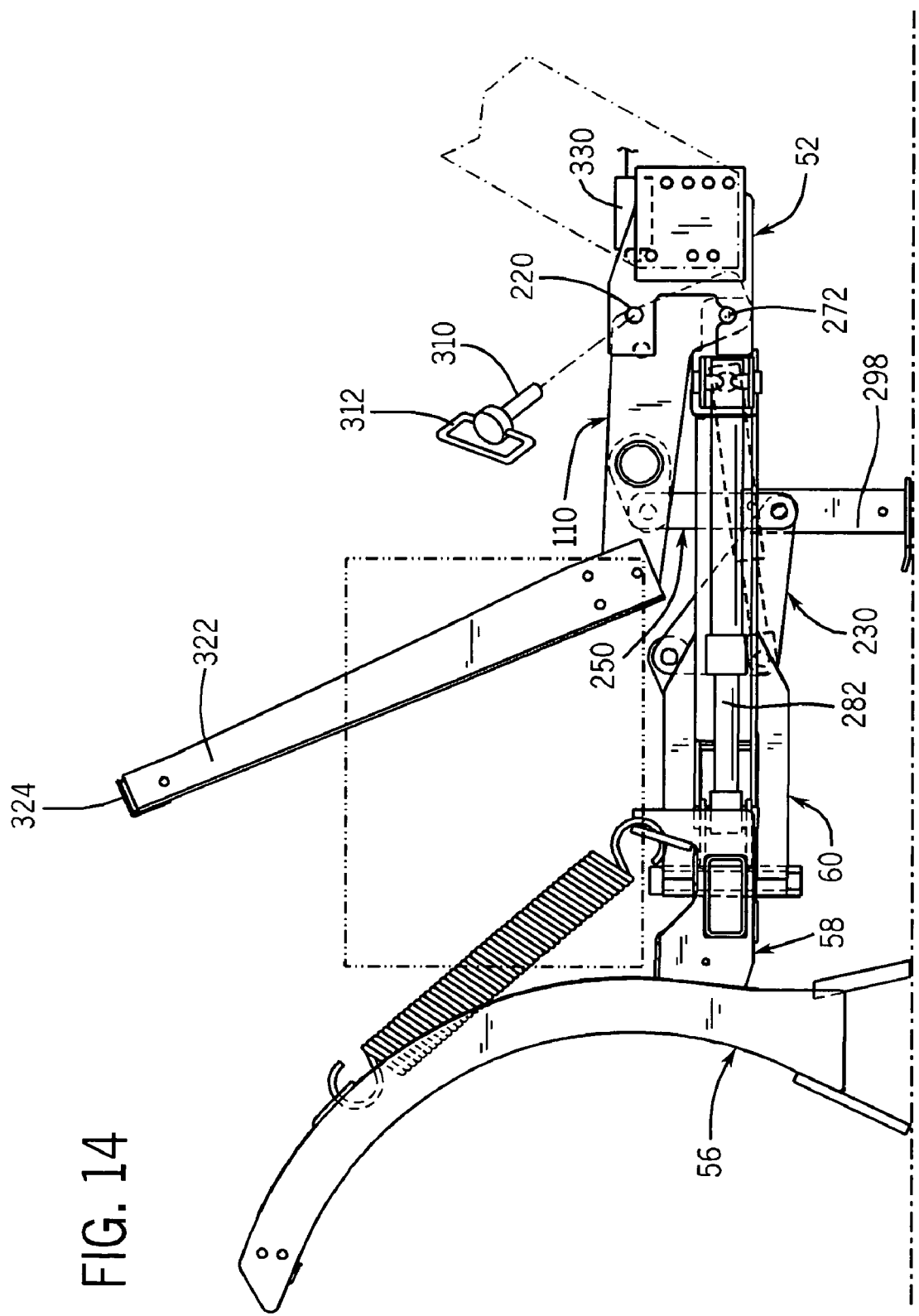

HITCH SYSTEM USING A VIDEO CAMERA TO FACILITATE HITCH ALIGNMENT

BACKGROUND OF THE INVENTION

Field of the Invention

The present invention relates generally to devices used to facilitate hitching an implement or trailer to a vehicle, and more particularly to a video monitoring system which may be used by the operator of a vehicle to guide the approach of the vehicle to an implement or a trailer or the like to bring connecting members of a hitch mechanism respectively located on the vehicle and on the implement or trailer into alignment and engagement with each other.

Once the exclusive domain of municipality-operated heavy trucks, snow plows have been used with light and medium duty trucks for decades. As would be expected in any area of technology which has been developed for that period of time, snow plows for light and medium duty trucks have undergone tremendous improvement in a wide variety of ways over time, evolving to increase both the usefulness of the snow plows as well as to enhance the ease of using them. The business of manufacturing snow plows for light and medium duty trucks has been highly competitive, with manufacturers of competing snow plows differentiating themselves based on the features and enhanced technology that they design into their products.

In the past several years one of the most important of these features has been the ease of installation of a snow plow. While the first snow plows were bolted onto supports which were typically welded onto the frame of a truck at the front end thereof, such an installation mechanism made the installation both difficult and time consuming. Recent years have seen the inclusion of various mechanisms for mounting a snow plow on a truck which have improved the snow plow installation process. Most of these hitch mounting mechanisms require a relatively precise degree of accuracy as the truck-mounted hardware is moved to approach the snow plow-mounted hardware.

One such hitch mounting mechanism is shown in U.S. patent application Ser. No. 10/192,336, filed on Jul. 10, 2002, entitled "Snow Plow Quick Connect/Disconnect Hitch Mechanism and Method," which patent application is assigned to the assignee of the present patent application. U.S. patent application Ser. No. 10/192,336 is hereby incorporated herein by reference. It teaches an improved hitch mounting mechanism and method of operating the same, which allows the snow plow to be both connected to and disconnected from a truck easily and simply, without requiring tools. The process of connecting or disconnecting the snow plow to or from the truck with the hitch mounting mechanism of U.S. patent application Ser. No. 10/192,336 is so simple and easy to use that it can be done by a single person without requiring assistance.

Thus, the primary difficulty that remains in the attachment of a snow plow to a truck is properly aligning the truck as it is driven to approach the snow plow. Since snow plows for light and medium duty trucks weigh hundreds of pounds and are somewhat unwieldy, the process can be quite time consuming and awkward, particularly when it is being done during the winter when the weather is cold. The other factor that exacerbates the problem is when a single person is trying to attach the plow onto the truck, since when driving the truck into position adjacent the snow plow the driver of the truck is unable to see the snow plow over the hood of the truck.

Only by climbing out of the cab or passenger compartment of the truck and walking to the front of the truck can the driver see how close to (or how far from) being properly aligned the mating hitch mounting mechanism components on the truck and the snow plow are. The snow plow installation procedure thus often becomes a repetitive process in which it takes several attempts to properly align the truck with the snow plow before proper alignment is achieved. This can be a time consuming and frustrating experience for even the most experienced of snow plow owners.

It is accordingly the primary objective of the present invention that it guide the driver of a truck in the approach to a snow plow to bring the hitch mounting mechanism components on the truck into alignment with the mating hitch mounting mechanism components on the snow plow. It is a further objective of the present invention that it provide a hitch alignment system which is operable by a single person, namely the driver of the truck. It is a related objective of the present invention that the driver of a truck using the hitch alignment system never need leave the cab of the truck to guide the truck from a distance well away from the snow plow as it approaches and moves into alignment and engagement with the snow plow.

It is a further objective of the present invention that the hitch alignment system be relatively easy to install. It is a related objective of the present invention that the hitch alignment system be both vehicle independent and snow plow independent, so that it will be susceptible to installation on any vehicle and to any type of mounting arrangement for any snow plow or other implement. It is yet another objective of the present invention that the hitch alignment system be simple to operate and use, requiring either minimal or no training to operate.

The hitch alignment system of the present invention must also be of construction which is both durable and long lasting, and it should also require little or no maintenance to be provided by the user throughout its operating lifetime. In order to enhance the market appeal of the hitch alignment system of the present invention, it should also be of relatively inexpensive construction to thereby afford it the broadest possible market. Finally, it is also an objective that all of the aforesaid advantages and objectives of the hitch alignment system of the present invention be achieved without incurring any substantial relative disadvantage.

SUMMARY OF THE INVENTION

The disadvantages and limitations of the background art discussed above are overcome by the present invention. With this invention, a video camera is mounted on a truck or other vehicle in a position which will enable a video picture from the video camera to be used to drive the truck into the a position in which the hitching mechanism on the truck is exactly aligned with the hitching mechanism on a snow plow, trailer, or other similar attachment. In the simplest embodiment, there are three elements of the video camera facilitated hitch alignment system of the present invention.

The first element of the video camera facilitated hitch alignment system of the present invention is the video camera, which is located in a weather-resistant enclosure which is installed onto either the truck (or other vehicle) itself or (more preferably) on the portion of the hitching mechanism which is mounted on the truck, thereby being in the closest possible proximity to the hitch latching mechanism. The second element of the present invention is a video monitor which is located in the cab or passenger compartment of the truck (or other vehicle) in a position to allow the driver of the truck to see the image displayed thereupon, which is the video picture "seen" by the video camera. The third element of the video camera facilitated hitch alignment system of the present invention is an alignment indicia or mark which is located on snow plow, trailer, or other attachment.

In its application for use to guide a truck into the proper engagement position for a snow plow, the video camera facilitated hitch alignment system of the present invention teaches the mounting of the video camera on a hitch frame nose piece which is mounted under the front bumper of the truck. The snow plow will be mounted onto this hitch frame nose piece. The video camera is oriented so that its lens is facing directly forwardly, in a straight and level manner.

The alignment mark is located on the snow plow on an element thereof which is at the rear thereof. When the snow plow is in position to allow it to be latched onto the hitch frame nose piece on the truck, this alignment mark will be located immediately in front of the lens of the video camera. Thus, it will be appreciated that the center point of the alignment mark is at the same height with respect to the ground as is the lens of the video camera.

The video monitor is mounted inside the cab or passenger compartment of the truck (or other vehicle), and it may be either a CRT monitor or an LCD video display monitor. The video monitor may be black and white or color, and its size is preferably at least five inches measured diagonally. It may be located on or in the dash of the cab or passenger compartment of the truck, or it may even be part of an integrated system included in the truck, such as a satellite navigation system or a DVD entertainment system. The video camera may either be wired to the monitor, or it may be a battery-powered wireless system, which transmits the video picture to the monitor.

In another embodiment, the video camera facilitated hitch alignment system of the present invention may be used with a conventional trailer which is pulled by a vehicle. In this case, the video camera is mounted on the rear of the vehicle and faces rearwardly. The alignment mark may be located on the trailer, near to the front end and the hitching mechanism thereof to facilitate proper alignment. Other similar variations are possible to enable the video camera facilitated hitch alignment system of the present invention to work with virtually any attachment or towed implement which is to be removably attached to a vehicle, including semi trucks and trailers.

It may therefore be seen that the present invention teaches a video camera facilitated hitch alignment system which may be used to guide the driver of a truck in the approach to a snow plow to bring the hitch mounting mechanism components on the truck into alignment with the mating hitch mounting mechanism components on the snow plow. The video camera facilitated hitch alignment system of the present invention is operable by a single person, namely the driver of the truck. The driver of a truck using the video camera facilitated hitch alignment system of the present invention never need leave the cab of the truck to guide the truck from a distance well away from the snow plow as it approaches and moves into alignment and engagement with the snow plow.

The video camera facilitated hitch alignment system of the present invention is relatively easy to install onto a truck and a snow plow. The video camera facilitated hitch alignment system of the present invention is both vehicle independent and snow plow independent, so that it may be installed on any vehicle and used with any type of mounting arrangement for any snow plow or other implement. The video camera facilitated hitch alignment system of the present invention is also simple to operate and use, and it requires little or no training to operate.

The video camera facilitated hitch alignment system of the present invention is of a construction which is both durable and long lasting, and which will require little or no maintenance to be provided by the user throughout its operating lifetime. The video camera facilitated hitch alignment system of the present invention is also of inexpensive construction to enhance its market appeal and to thereby afford it the broadest possible market. Finally, all of the aforesaid advantages and objectives of the video camera facilitated hitch alignment system of the present invention are achieved without incurring any substantial relative disadvantage.

DESCRIPTION OF THE DRAWINGS

These and other advantages of the present invention are best understood with reference to the drawings, in which:

FIG. 3 is a perspective view of a plow A-frame of the snow plow illustrated in FIGS. 1 and 2;

FIG. 4 is a perspective view of a pivoting lift bar which will be pivotally mounted at the rear end of the plow A-frame illustrated in FIG. 3;

FIG. 8 is a cutaway view of the various components of the snow plow frame assembled together, showing the hydraulic cylinder used to pivot the lift bar;

FIG. 9 is a partial view from the top showing the hitch mounting mechanism on one side of the snow plow illustrated in FIGS. 1 and 2 prior to installation;

FIG. 10 is a partial view from the top showing the components illustrated in FIG. 9 in a mounted position;

FIG. 12 is a side view of the snow plow illustrated in FIGS. 1 and 2 as the hitch frame nose piece is brought into engagement with a mounting pin on the pivoting lift bar;

FIG. 13 is a schematic depiction of the engagement of the mounting pin with a slot in the hitch frame nose piece;

FIG. 14 is a side view similar to that of FIG. 12, with the pivoting lift bar beginning to pivot to bring the mounting pin into engagement with the slot in the hitch frame nose piece;

DETAILED DESCRIPTION OF THE PREFERRED EMBODIMENT

Figure 16:
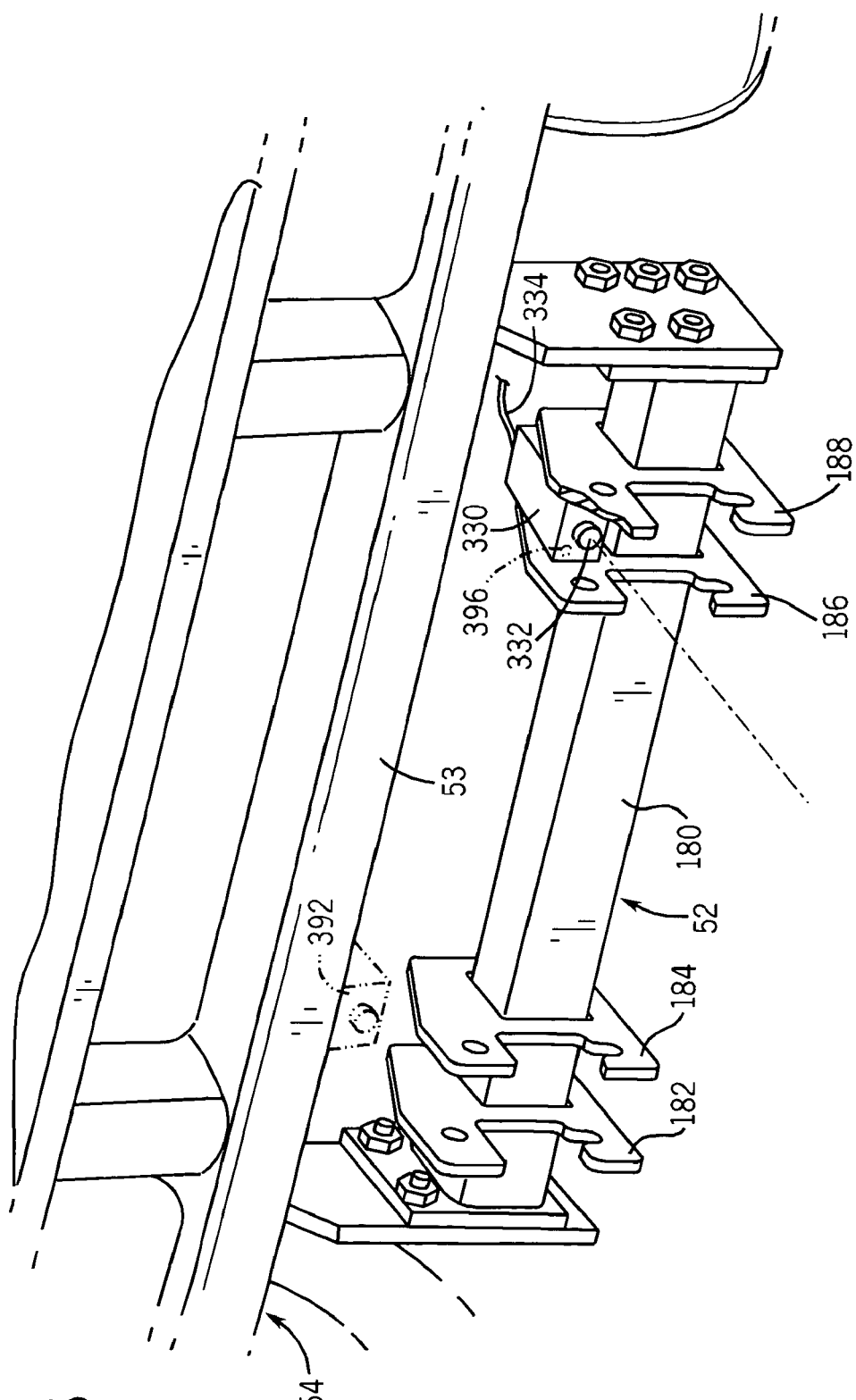
FIG. 16 is an isometric, partially cutaway view of the hitch frame nose piece illustrated in FIG. 5 mounted under the bumper of a truck, showing the television camera mounted thereupon.
Figure 17:
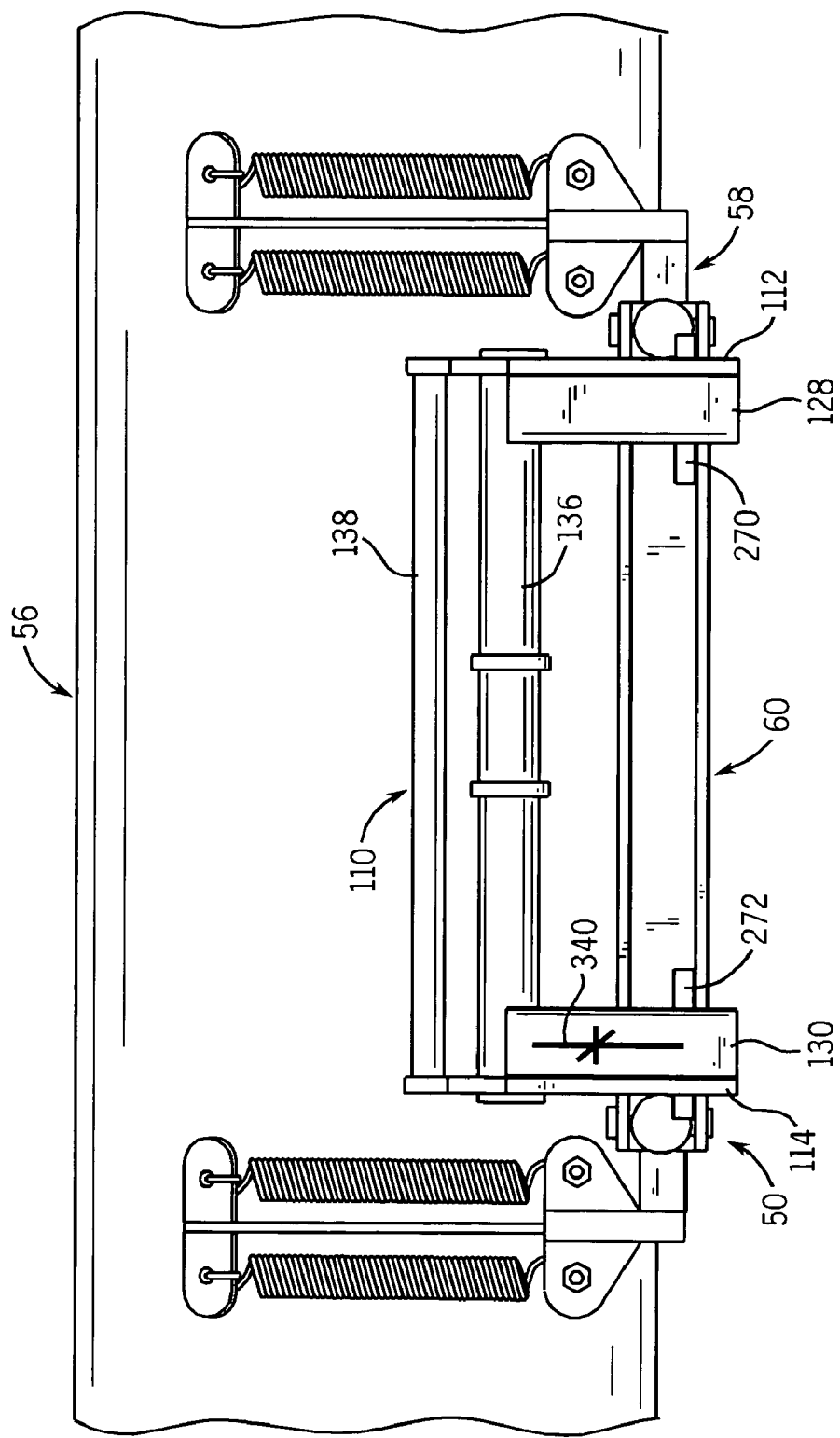
FIG. 17 is a partial rear plan view of the snow plow illustrated in FIGS. 1 and 2, showing the locating indicia placed on the rearmost portion of pivoting lift bar at the lower left thereof.
Figure 18:
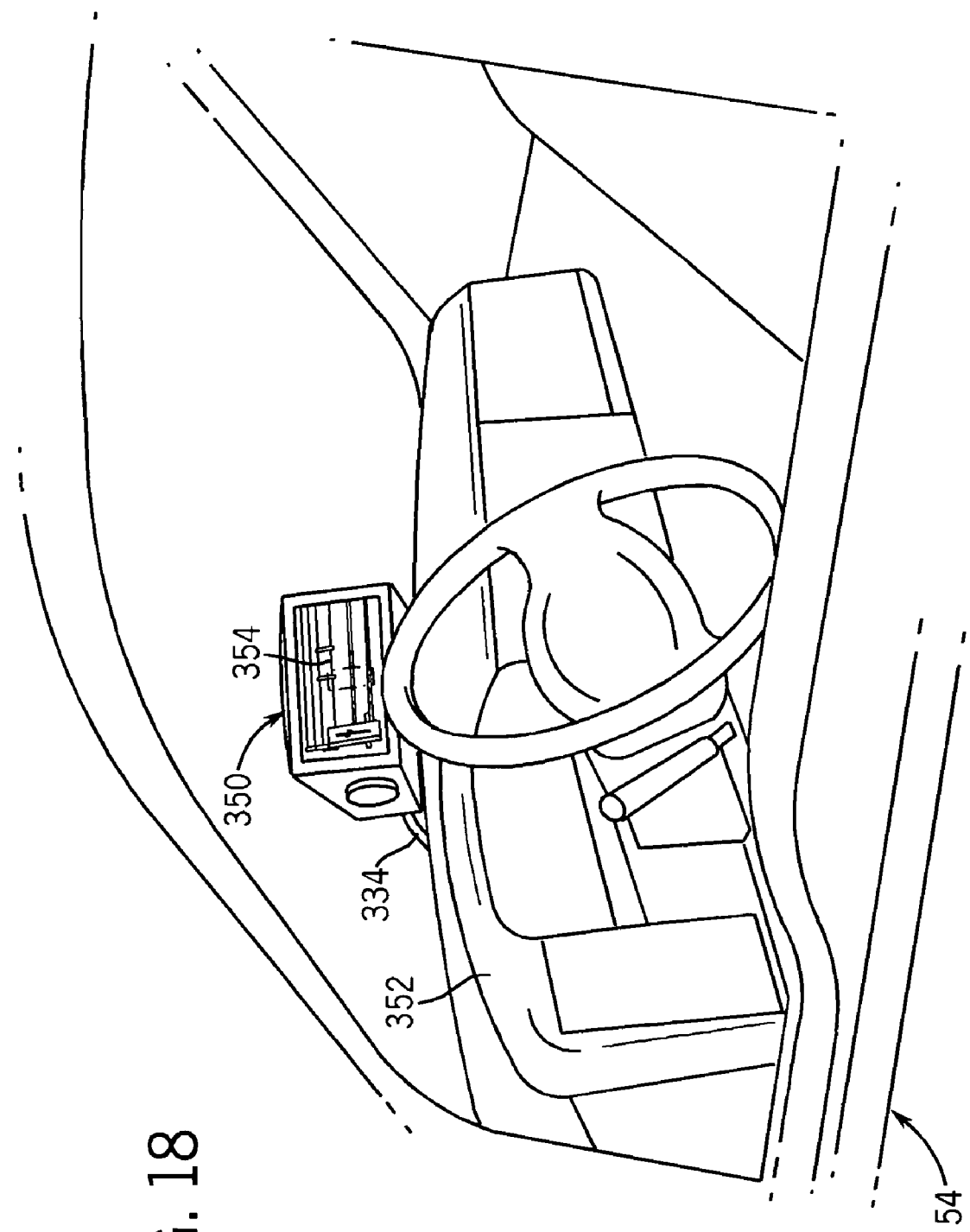
FIG. 18 is an isometric view of the interior of a truck from the driver-side door, showing the placement of a video monitor located in the cab in a position viewable by a driver.
Figure 19:
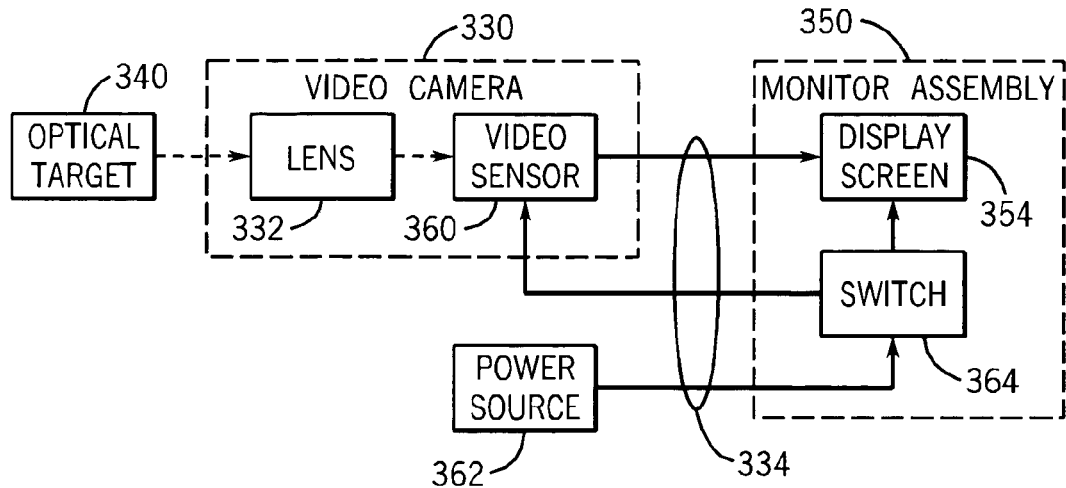
FIG. 19 is a schematic block diagram of a first embodiment of the present invention having a video camera for installation onto the hitch frame nose piece mounted under the bumper of a truck which video camera is hard wired to a video monitor located in the cab of the truck.
Figure 20:
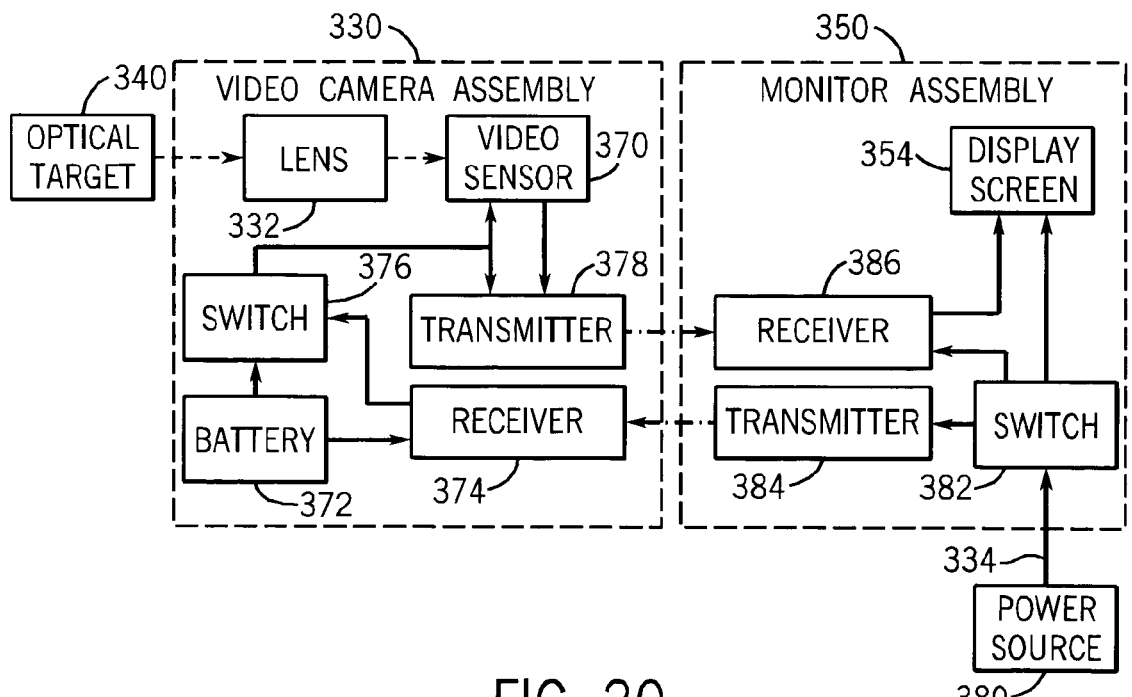
FIG. 20 is a schematic block diagram of a second embodiment of the present invention having a video camera for installation onto the hitch frame nose piece mounted under the bumper of a truck which video camera is wirelessly connected to a video monitor located in the cab of the truck.
Figure 21:
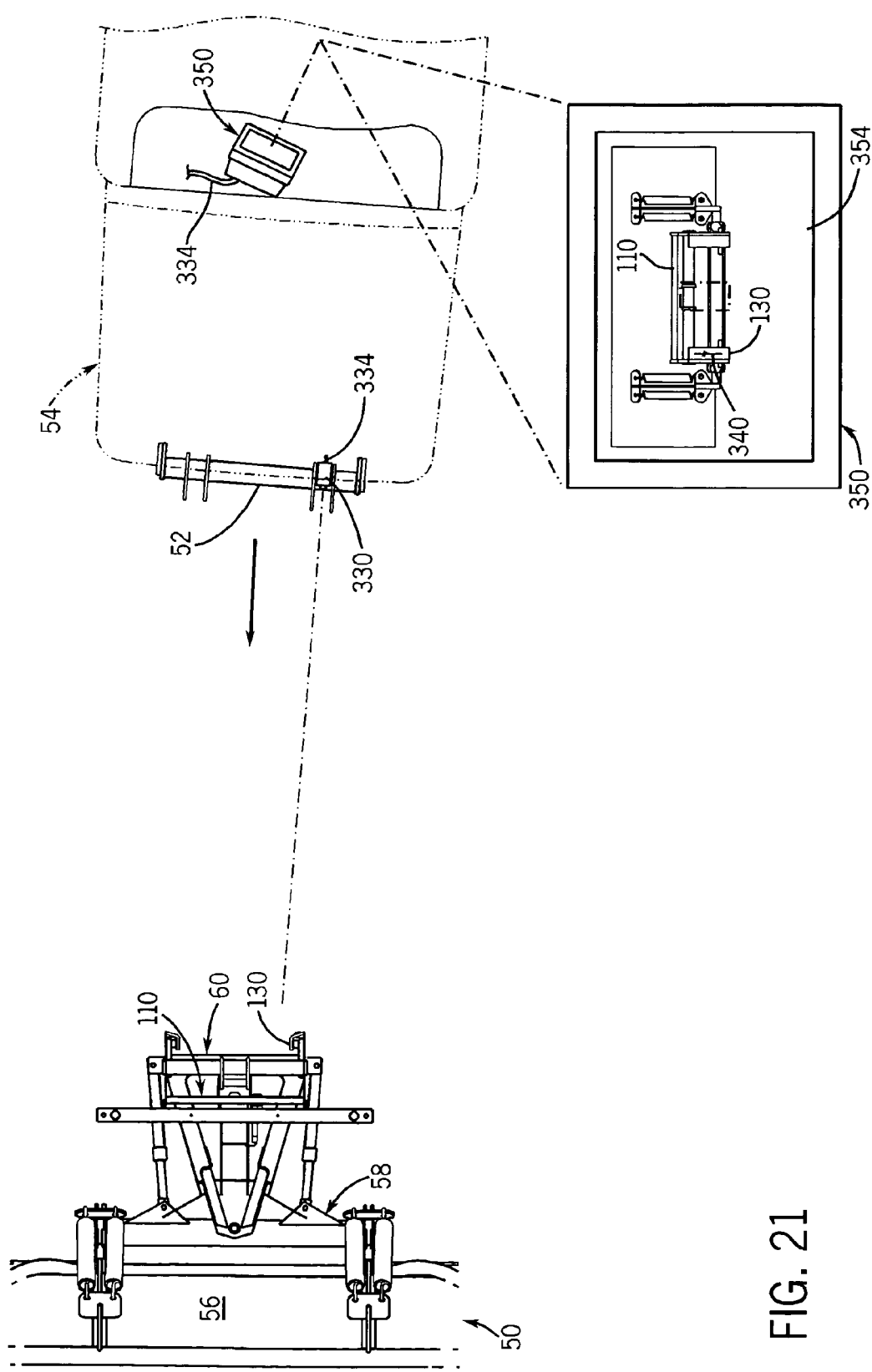
FIG. 21 is a somewhat schematic top plan view of a truck beginning to approach a snow plow, with the image of the locating indicia on the left rear of the snow plow being visible in the video monitor being superimposed in the figure.
Figure 22:
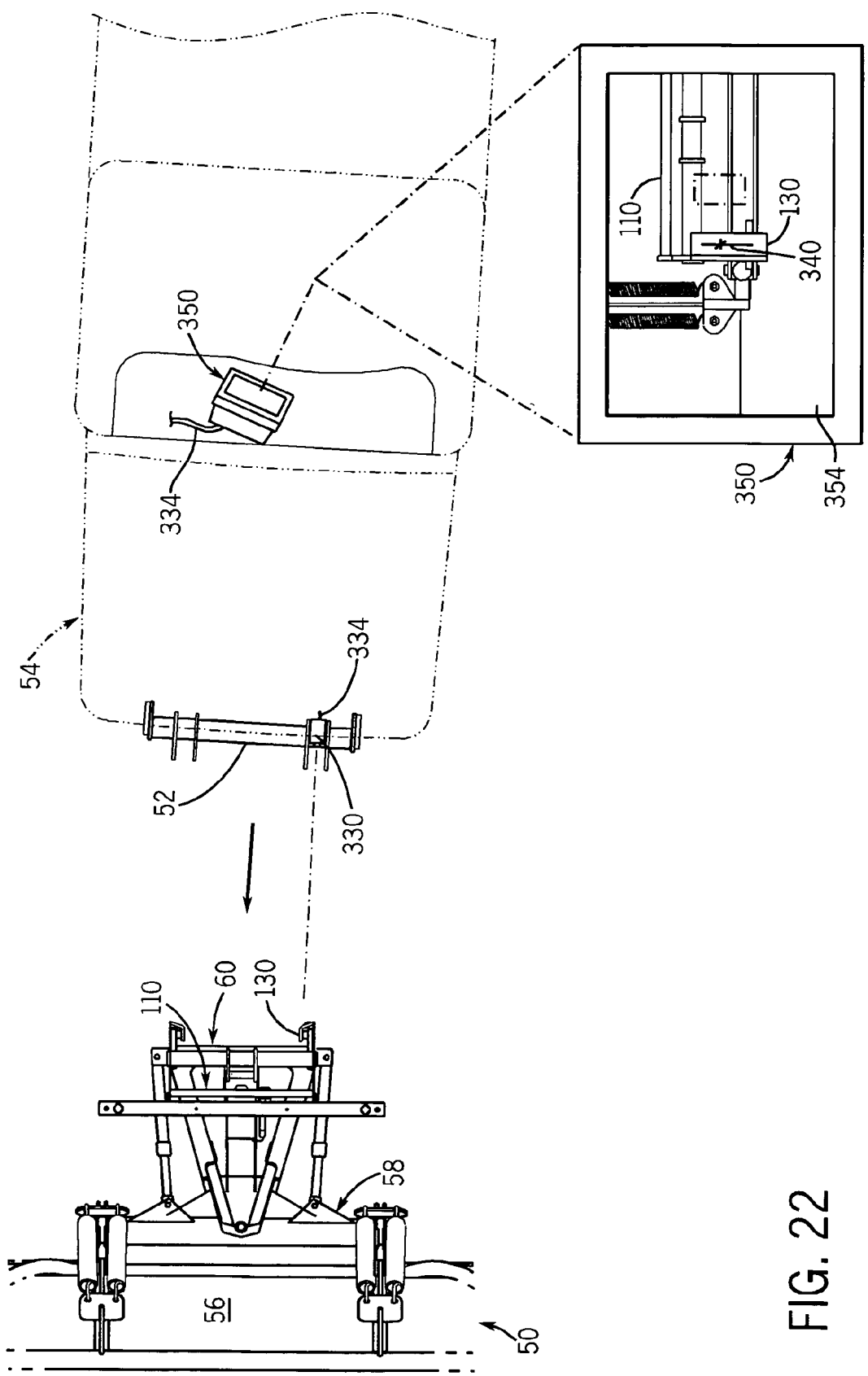
FIG. 22 is a view similar to that of FIG. 21, but with the truck closer to the snow plow than it is in FIG. 21, and with the image of the locating indicia on the left rear of the snow plow being visible in the video monitor and larger than it was in FIG. 21.
Figure 23:
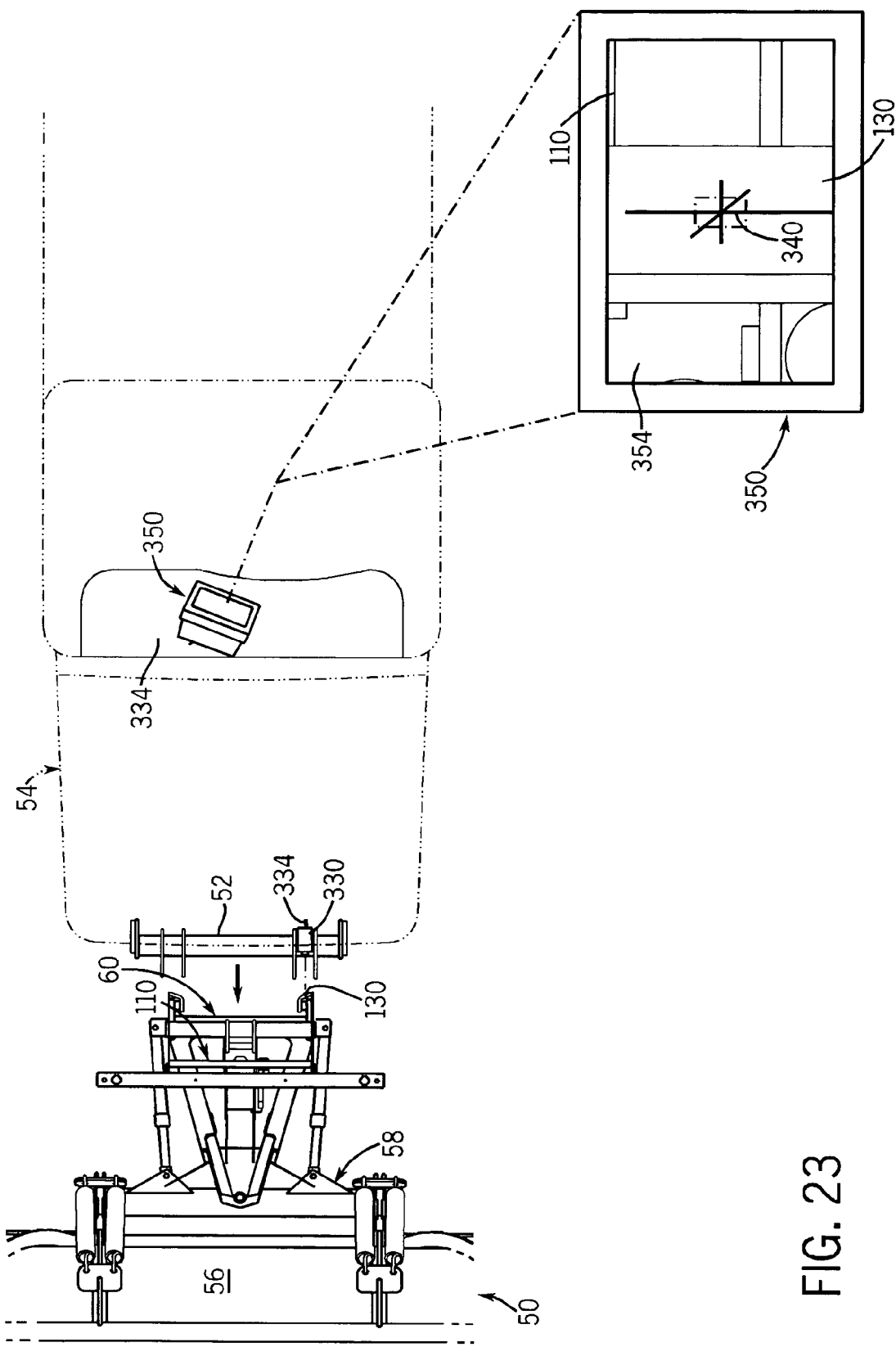
FIG. 23 is a view similar to that of FIGS. 21 and 22, but with the truck being close adjacent to the snow plow, and with the image of the locating indicia on the left rear of the snow plow dominating the image on the video monitor.
Figure 24:
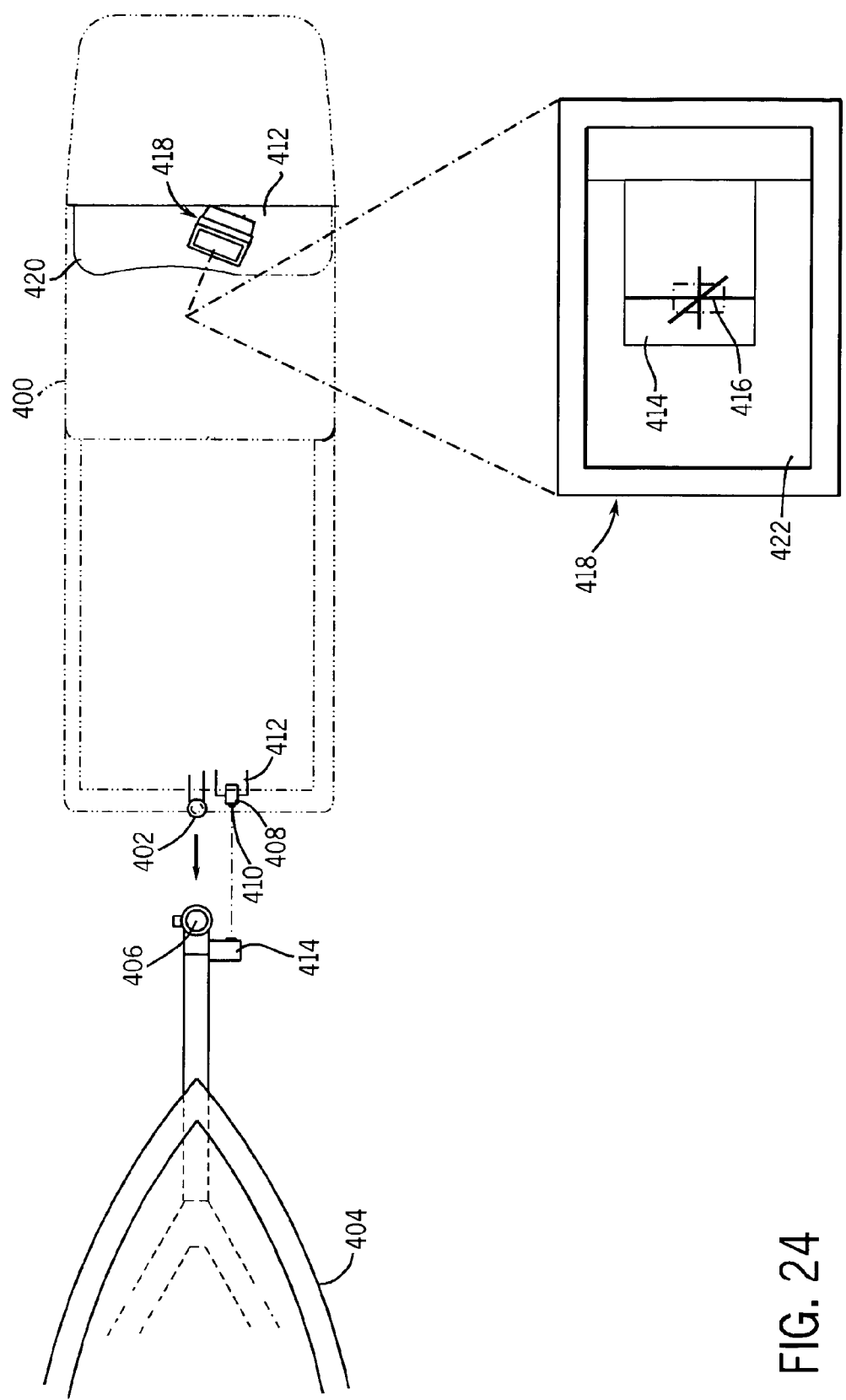
FIG. 24 is a somewhat schematic top plan view of a truck with a trailer hitch and a video camera located on the back thereof as the truck is backing toward a boat trailer having a target area with a locating indicia visible thereupon.

The preferred embodiment of the present invention is illustrated in a series of figures, of which FIGS. 1 through 8 illustrate components of the snow plow which utilizes the video camera facilitated hitch alignment system of the present invention. FIGS. 9 through 15 illustrate the operation of the hitch components contained on the snow plow and the hitch frame nose piece, and FIGS. 16 through 18 illustrate the installation of the components of the video camera facilitated hitch alignment system of the present invention onto the hitch components contained on the snow plow and the hitch frame nose piece. FIGS. 19 and 20 schematically illustrate the operation of the video camera facilitated hitch alignment system of the present invention, and FIGS. 21 through 23 illustrate the operation of the video camera facilitated hitch alignment system of the present invention to facilitate the attachment of the snow plow to the hitch frame nose piece. Finally, FIG. 24 illustrates an alternate embodiment in which the video camera facilitated hitch alignment system of the present invention is used to facilitate the attachment of a trailer to a trailer hitch.

While the video camera facilitated hitch alignment system of the present invention may be installed for use with virtually any detachable snow plow, the example described herein depicts its use with a snow plow of the type described in U.S. patent application Ser. No. 10/192,336, filed on Jul. 10, 2002, entitled "Snow Plow Quick Connect/Disconnect Hitch Mechanism and Method," which application is hereby incorporated herein by reference.

Figure 1:
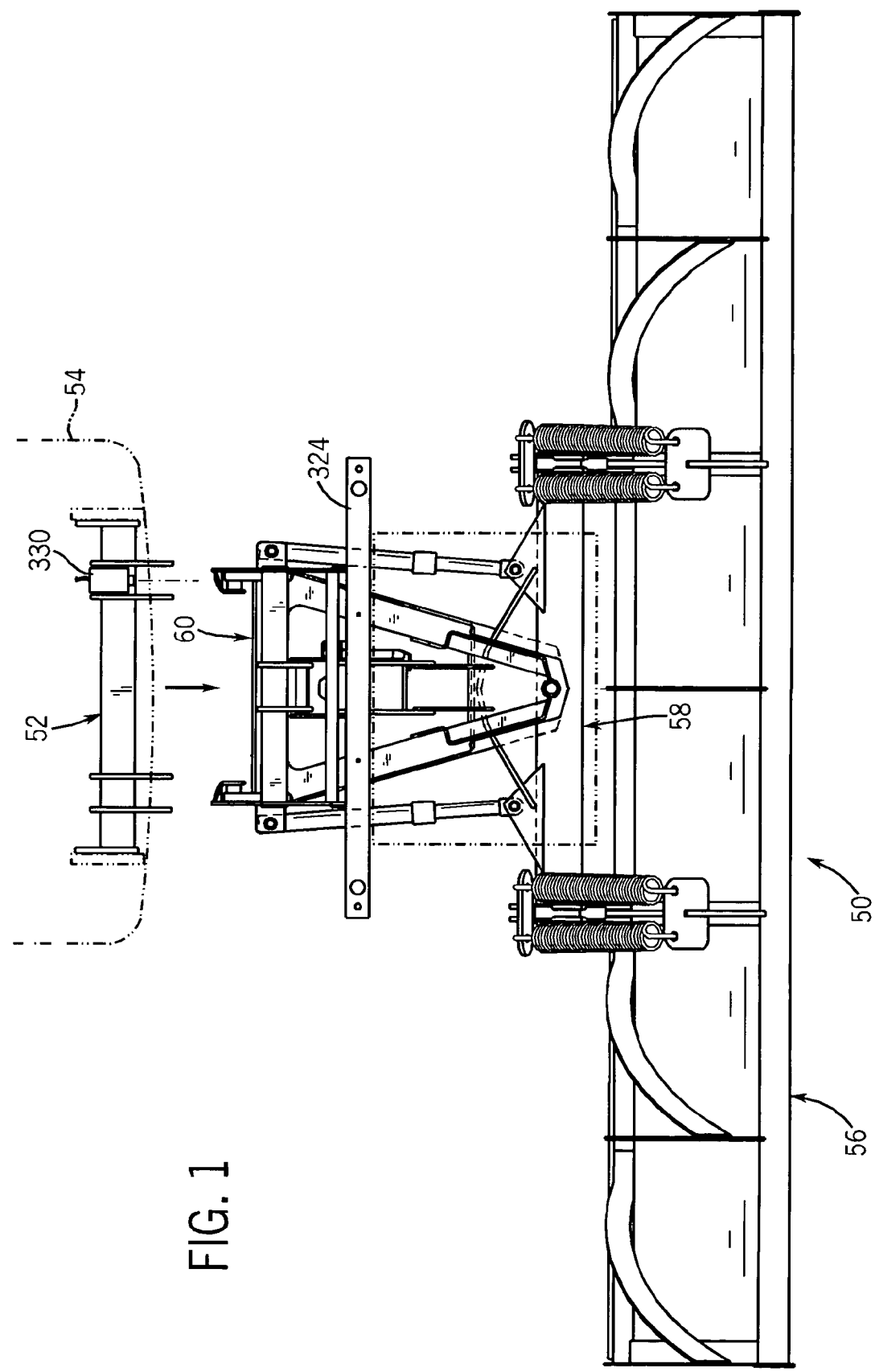
FIG. 1 is a top plan view of a hitch frame nose piece which will be installed onto a truck under the front bumper thereof and a snow plow which may be detachably mounted onto the hitch frame nose piece at the front of the truck, showing a television camera mounted on the hitch frame nose piece.
Figure 2:
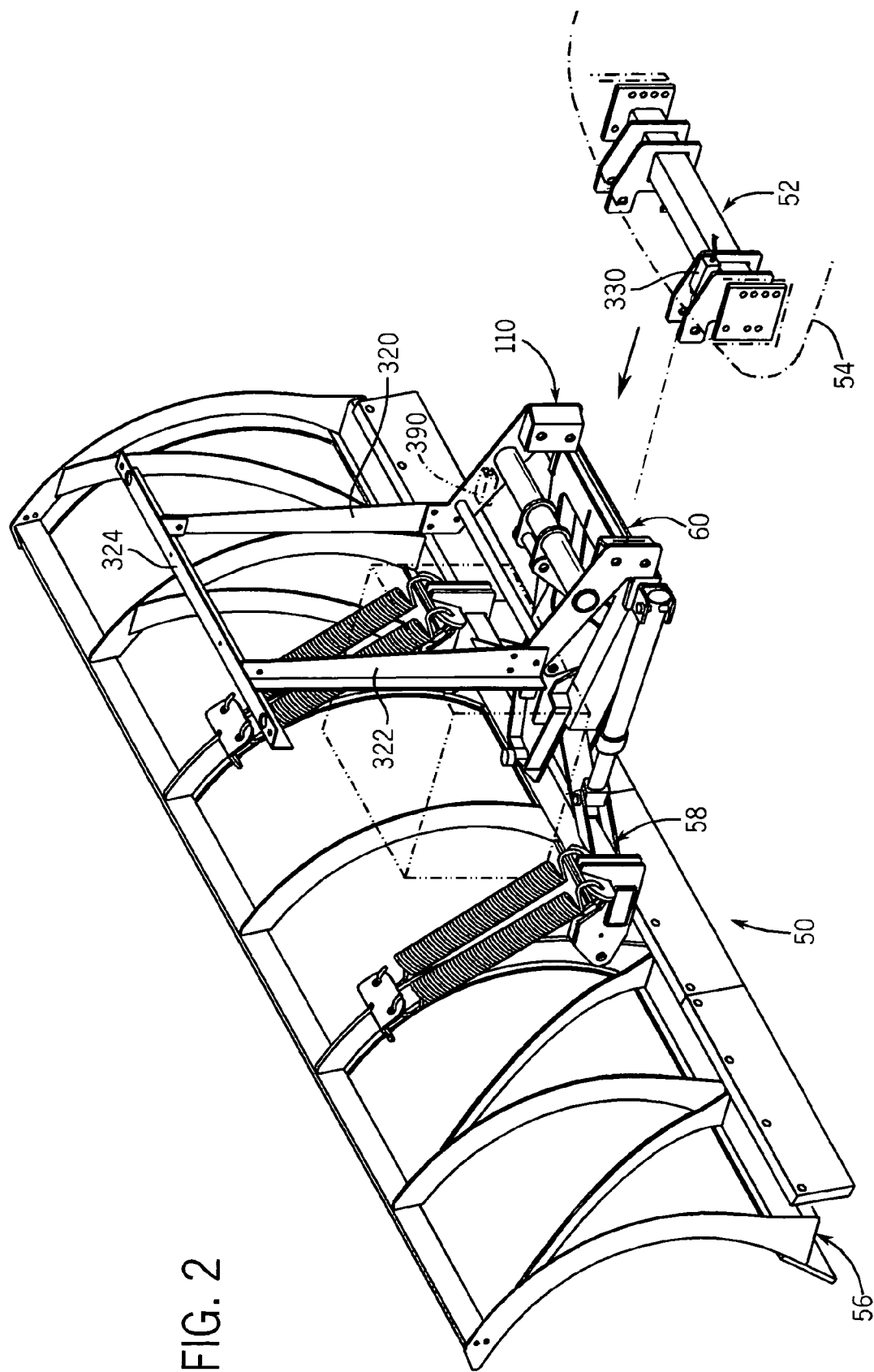
FIG. 2 is a perspective view of the snow plow and the hitch frame nose piece illustrated in FIG. 1 from the left side and rear thereof, showing the television camera mounted on the hitch frame nose piece and a locating indicia placed on the snow plow at a left rear portion thereof.

The snow plow described in the above-identified patent application is illustrated in FIGS. 1 and 2. In these figures, a snow plow assembly 50 is shown as being spaced away from a hitch frame nose piece 52 which is mounted under the front bumper 53 of a truck 54. The snow plow assembly 50 includes a plow blade 56 which is mounted on a swing frame 58, which in turn is pivotally mounted on a plow A-frame 60. The rear-most portions of the plow A-frame 60 are designed to be engaged by the hitch frame nose piece 52 to allow the snow plow assembly 50 to be mounted on the truck 54. Accordingly, the only part of the snow plow assembly 50 which must be described in detail for the purposes of the video camera facilitated hitch alignment system of the present invention is the plow A-frame 60.

Moving then to FIG. 3, the plow A-frame 60 is illustrated. The plow A-frame 60 as illustrated in FIG. 3 has its front end shown at the left of FIG. 3 and its rear end shown at the right of FIG. 3, and is symmetric around an axis running from the front to the rear thereof. The plow A-frame 60 tapers from a narrower width at the front thereof to a wider width at the rear thereof.

The basic shape of the plow A-frame 60 is formed by a top plate 62 and a bottom plate 64, which are essentially parallel and are spaced apart from each other. The configurations of the top plate 62 and the bottom plate 64 as viewed from the top (or from the bottom) resemble a portion of the capital letter "A," with the portions of the sides of the "A" above the crossbar of the "A" being absent. There is a large aperture extending through each of the top plate 62 and the bottom plate 64 above the crossbar of the "A," which apertures resemble an isosceles trapezoid. The top plate 62 and the bottom plate 64 are preferably made of steel plate.

Mounted between the sides of the top plate 62 and the bottom plate 64 at the location of the crossbar of the "A" and extending rearwardly so as to resemble abbreviated legs of the "A" below the crossbar are two lugs 66 and 68 made of flat bar stock. The lugs 66 and 68 are also preferably made of steel, and are welded onto the sides of the top plate 62 and the bottom plate 64. The portion of the lug 66 which extends rearwardly from the top plate 62 and the bottom plate 64 has an aperture 70 extending therethrough, and the portion of the lug 68 which extends rearwardly from the top plate 62 and the bottom plate 64 has an aperture 72 extending therethrough.

Portions of three sides of the top plate 62 are bent downwardly at a ninety degree angle to extend to the top of the bottom plate 64. Only one of these sides, a left side 74, is visible in FIGS. 1 and 2. The left side 74 of the top plate 62 extends from just in front of the lug 68, and extends approximately two-thirds of the way toward the front end of the plow A-frame 60. A right side of the top plate 62 (which is the mirror image of the left side 74 of the top plate 62) and a rear side of the top plate 62 extending between the lugs 66 and 68 are also bent downwardly at ninety degree angles to extend to the top of the bottom plate 64. These three sides are all welded to the bottom plate 64 to create a box-like structure. A rectangular plate 76 is located just in front of the isosceles trapezoid-shaped apertures in the top plate 62 and the bottom plate 64, and extends between the sides of the top plate 62 and the bottom plate 64. The rectangular plate 76 is also preferably made of steel, and all four sides of the rectangular plate 76 are welded onto the top plate 62

(including the left side 74 and right side thereof) and the bottom plate 64 to provide the fourth side of the box-like structure.

Located between the rear of the top plate 62 at the location of the crossbar of the "A" and the rear of the bottom plate 64 at the location of the crossbar of the "A" are two lift cylinder mounts 78 and 80. The lift cylinder mounts 78 and 80 are parallel both to each other and to the plane which divides the plow A-frame 60 into left and right sides thereof. The lift cylinder mounts 78 and 80 each extend from slots 82 and 84, respectively, located in the crossbar of the "A" of the top plate 62 and slots 86 and 88, respectively, located in the crossbar of the "A" of the bottom plate 64. The lift cylinder mounts 78 and 80 are also preferably made of steel, and their ends are welded into the slots 82 and 84, respectively, in the top plate 62 and the slots 86 and 88, respectively, in the bottom plate 64. The lift cylinder mounts 78 and 80 each have an aperture 90 or 92, respectively, located therein which apertures 90 and 92 are coaxial.

Located at the top of the aperture in the "A" in the plow A-frame 60 are two parallel, spaced-apart, pivot mount plates 94 and 96. The pivot mount plates 94 and 96 are also preferably made of steel, and are welded onto the rectangular plate 76, the portion of the top plate 62 adjacent thereto, and the portion of the bottom plate 64 adjacent thereto. The pivot mount plates 94 and 96 are mounted on opposite sides of the centerline of the plow A-frame 60, and extend rearwardly and upwardly from the rectangular plate 76, and are beneath a portion of the bottom plate 64. Located near the rearmost and uppermost ends of the pivot mount plates 94 and 96 are apertures 98 and 100, respectively, which are coaxial. The remaining components of the plow A-frame 60 are not of significance to the video camera facilitated hitch alignment system of the present invention, and so will not be discussed herein.

Referring next to FIG. 4, a lift bar 110 is illustrated which forms part of the hitch mechanism of the snow plow 50. The lift bar 110 has two lift bar support members 112 and 114, which are located on the right and left sides, respectively, of the lift bar 110. Each of the lift bar support members 112 and 114 has a configuration consisting of three segments: rear mounting supports 116 and 118, respectively, which extend upward vertically; central support arms 120 and 122, respectively, which extend forwardly and upwardly from the top of the rear mounting supports 116 and 118, respectively; and front light bar supports 124 and 126, respectively, which extend upwardly from the forwardmost and upwardmost ends of the central support arms 120 and 122, respectively. The lift bar support members 112 and 114 are preferably made of steel plate.

Extending inwardly from the rear sides of rear mounting supports 116 and 118 are segments of angled stock 128 and 130, respectively. It should be noted that the angle defined by each of the segments of angled stock 128 and 130 is less than ninety degrees, as, for example, approximately seventy degrees. The reason for this angle will become apparent below in conjunction with the discussion of FIGS. 9 and 10. The angled stock segments 128 and 130 are also preferably made of steel, and are welded onto rear mounting supports 116 and 118, respectively, so that the rear mounting supports 116 and 118 and the angled stock segments 128 and 130 together form vertically-oriented channels which are essentially U-shaped. Referring for the moment to FIG. 3 in addition to FIG. 4, the space between the rear mounting support 116 and the angled stock segment 128 of the lift bar 110 is designed to admit the lug 66 of the plow A-frame 60 with space between the lug 66 and the inside of the angled stock segment 128, and similarly the space between the angled stock segment 130, and the rear mounting support 118 of the lift bar 110 is designed to admit the lug 68 of the plow A-frame 60 with space between the lug 68 and the inside of the angled stock segment 130.

Referring again solely to FIG. 4, a rectangular reinforcing segment 132 (preferably also made of steel) is located at the bottom of the U-shaped channel formed by the rear mounting support 116 and the angled stock segment 128, and is welded to the bottoms of the rear mounting support 116 and the angled stock segment 128. Similarly, a rectangular reinforcing segment 134 (preferably also made of steel) is located at the bottom of the U-shaped channel formed by the rear mounting support 118 and the angled stock segment 130, and is welded to the bottoms of the rear mounting support 118 and the angled stock segment 130.

Not illustrated in the figures but used to reinforce the construction of the lift bar 110 are two additional rectangular reinforcing segments which are respectively located above the reinforcing segments 132 and 134. On the right side of the lift bar 110, the first of these additional reinforcing segments (preferably also made of steel) is located near the top of the U-shaped channel formed by the rear mounting support 116 and the angled stock segment 128, and is welded to the tops of the rear mounting support 116 and the angled stock segment 128. Similarly, the other of these reinforcing segments (preferably also made of steel) is located at near the top of the U-shaped channel formed by the rear mounting support 118 and the angled stock segment 130, and is welded to the tops of the rear mounting support 118 and the angled stock segment 130.

Extending between the lift bar support members 112 and 114 are a larger diameter hollow round upper pin support tube 136 and a smaller diameter round light bar brace 138. The upper pin support tube 136 and the light bar brace 138 are both also preferably made of steel. One end of the upper pin support tube 136 extends through an aperture 140 located in an intermediate position in the central support arm 120 of the lift bar support member 112, and the other end of the upper pin support tube 136 extends through an aperture 142 located in an intermediate position in the central support arm 122 of the lift bar support member 114. The ends of the upper pin support tube 136 are welded onto the central support arms 120 and 122. One end of the light bar brace 138 is welded onto the lift bar support member 112 at the intersection of the central support arm 120 and the light bar support 124, and the other end of the light bar brace 138 is welded onto the lift bar support member 114 at the intersection of the central support arm 122 and the light bar support 126.

Two upper pin hanger plates 144 and 146 are mounted on the upper pin support tube 136 in spaced-apart fashion near the middle of the upper pin support tube 136. The upper pin hanger plates 144 and 146 have apertures 148 and 150, respectively, extending therethrough near one end thereof, and the upper pin support tube 136 extends through these apertures 148 and 150. The upper pin hanger plates 144 and 146 are both also preferably made of steel, and are welded onto the upper pin support tube 136 in a manner whereby they are projecting forwardly. A tubular upper pin 152 extends through apertures 154 and 156 in the upper pin hanger plates 144 and 146, respectively, near the other end thereof. The upper pin 152 is also preferably made of steel, and is welded onto the upper pin hanger plates 144 and 146.

Located in the rear mounting support 116, the angled stock segment 128, the angled stock segment 130, and the rear mounting support 118 near the bottoms thereof are apertures 158, 160, 162, and 164, respectively, which are aligned with each other and which together define a pivot axis about which the lift bar 110 will pivot when it is mounted onto the plow A-frame 50 (Illustrated in FIG. 3). Located in the rear mounting support 116, the angled stock segment 128, the angled stock segment 130, and the rear mounting support 118 nearer the tops thereof than the bottoms thereof are apertures 166, 168, 170 (not shown in FIG. 4), and 172, which are aligned with each other. The apertures 166 and 168 define a first location into which a retaining pin (not shown in FIG. 4) will be placed to mount the snow plow of the present invention onto the truck 54 (shown in FIGS. 1 and 2), and the apertures 170 and 172 define a second location into which another retaining pin (not shown in FIG. 4) will be placed to mount the snow plow of the present invention onto the truck.

Figure 5:
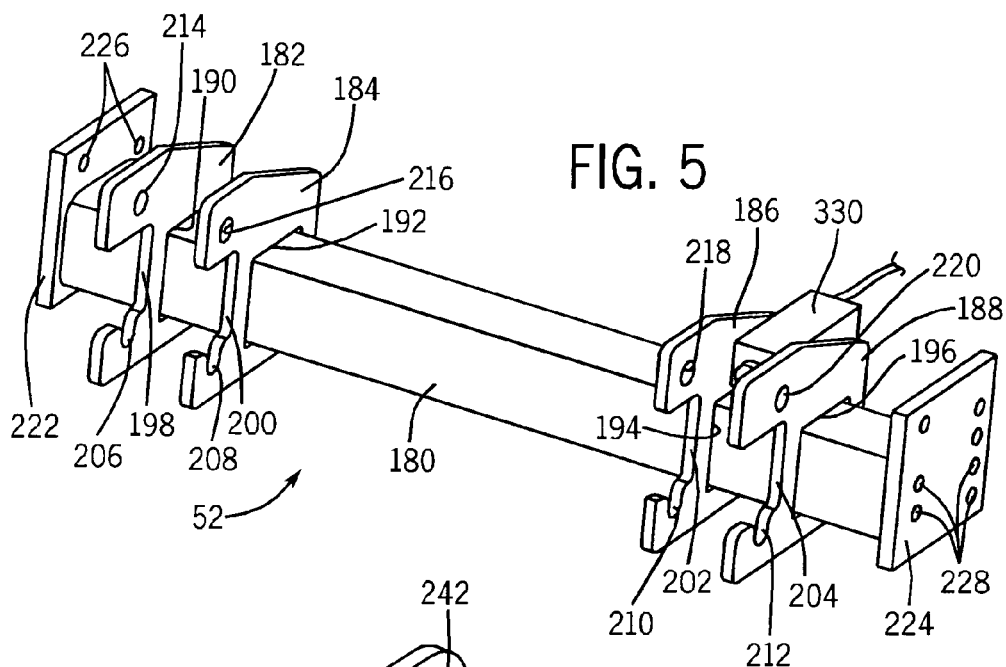
FIG. 5 is a perspective view of the hitch frame nose piece illustrated in FIGS. 1 and 2, which will be mounted on a truck under the front bumper thereof.

Referring now to FIG. 5, a hitch frame nose piece 52 which will be mounted onto the truck 54 (shown in FIGS. 1 and 2) under the front bumper 53 thereof is illustrated. The hitch frame nose piece 52 has a square hitch frame tube 180 that is horizontally oriented. Four hitch brackets 182, 184, 186, and 188 are mounted on the square hitch frame tube 180 in spaced-apart pairs located nearer the ends of the square hitch frame tube 180 than the center thereof. The hitch brackets 182, 184, 186, and 188 have square apertures 190, 192, 194, and 196, respectively, extending therethrough to receive therein the square hitch frame tube 180. Both the square hitch frame tube 180 and the hitch brackets 182, 184, 186, and 188 are preferably made of steel, and the hitch brackets 182, 184, 186, and 188 are welded onto the square hitch frame tube 180.

Referring for the moment to FIG. 4 in addition to FIG. 5, the space between the hitch bracket 182 and the hitch bracket 184 of the hitch frame nose piece 52 is designed to admit the rear mounting support 116 and the angled stock segment 128 of the lift bar 110, and similarly the space between the hitch bracket 186 and the hitch bracket 188 of the hitch frame nose piece 52 is designed to admit the angled stock segment 130 and the rear mounting support 118 of the lift bar 110. The hitch brackets 182, 184, 186, and 188 have rectangular notches 198, 200, 202, and 204, respectively, cut into the front sides thereof.

Located in the hitch brackets 182, 184, 186, and 188 in the bottoms of the rectangular notches 198, 200, 202, and 204, respectively, are slots 206, 208, 210, and 212, respectively. The slots 206, 208, 210, and 212 have rounded bottoms, and are axially aligned. Also located in the hitch brackets 182, 184, 186, and 188 above the tops of the rectangular notches 198, 200, 202, and 204, respectively, are apertures 214, 216, 218, and 220, respectively. The apertures 214, 216, 218, and 220 are also axially aligned.

In the preferred embodiment, the hitch brackets 182, 184, 186, and 188 are flat, although if desired the hitch brackets 182 and 188 may have their forward-most portions flanged outwardly to act as guides to direct the lift bar 110 (illustrated in FIG. 4) into engagement with the hitch frame nose piece 52.

The respective ends of the square hitch frame tube 180 are mounted onto mounting plates 222 and 224. The mounting plates 222 and 224 are also preferably made of steel, and the ends of the square hitch frame tube 180 are welded onto the mounting plates 222 and 224. Located in the mounting plates 222 and 224 are a plurality of apertures 226 and 228, respectively, which will be used to mount the hitch frame nose piece 52 onto the frame of the truck 54 (shown in FIGS. 1 and 2) using mounting brackets (not shown in FIG. 5) in a manner which is conventional.

Figure 6:
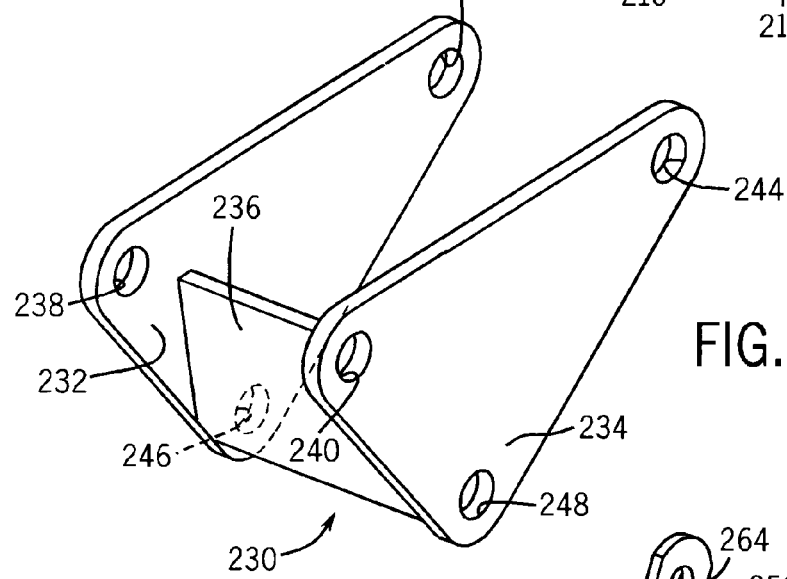
FIG. 6 is a perspective view of a bellcrank that is used to operate the pivoting lift bar illustrated in FIG. 4.

Referring next to FIG. 6, a bellcrank 230 is illustrated. The bellcrank 230 has parallel, spaced apart triangular pivot plates 232 and 234. One of the sides of the triangle is shorter than the other two in each of the pivot plates 232 and 234. A gusset plate 236 is mounted between the pivot plates 232 and 234 with one side thereof near the shortest side of the triangle to support the pivot plates 232 and 234 in their spaced-apart configuration. In the preferred embodiment, both the pivot plates 232 and 234 and the gusset plate 236 are made of steel, and are welded together.

The pivot plates 232 and 234 have apertures 238 and 240, respectively, located therein near a first corner of the triangle which will be used to mount the bellcrank 230 for pivotal movement from the apertures 98 and 100 of the pivot mount plates 94 and 96, respectively (illustrated in FIG. 3). The pivot plates 232 and 234 have apertures 242 and 244, respectively, located therein near a second corner of the triangle which will be connected via the element to be discussed in FIG. 7 below to drive the upper pin 152 of the lift bar 110 (illustrated in FIG. 4). The pivot plates 232 and 234 have apertures 246 and 248, respectively, located therein near the third corner of the triangle that will be connected to a hydraulic cylinder (not shown in FIG. 6). The short side of the triangle is between the first and third corners of the triangle. The side of the gusset plate 236 adjacent this short side will act as a lift stop to limit pivotal movement of the gusset plate 236 when this side of the gusset plate 236 contacts the pivot mount plates 94 and 96 (illustrated in FIG. 3).

Figure 7:
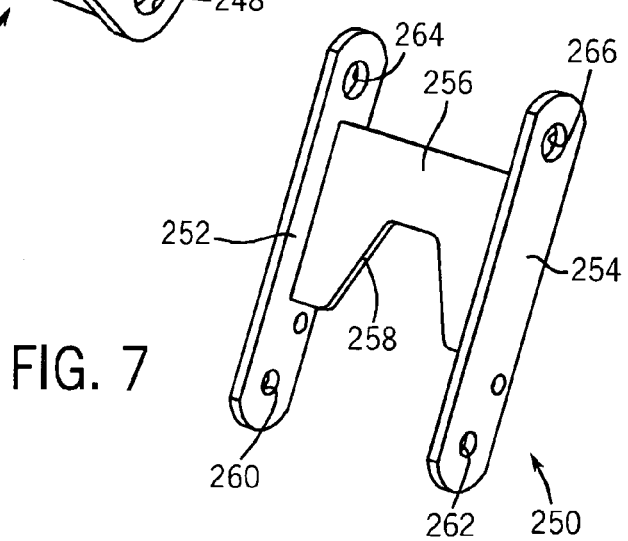
FIG. 7 is a perspective view of a lift link which connects the bellcrank illustrated in FIG. 6 to the pivoting lift bar illustrated in FIG. 4.

Referring now to FIG. 7, a lift link 250 is illustrated. The lift link 250 has parallel, spaced apart arms 252 and 254. A gusset plate 256 is mounted between the arms 252 and 254 in their spaced-apart configuration. The side of the gusset plate 256 that is oriented toward one end of the arms 252 and 254 has a notch 258 cut therein. In the preferred embodiment, both the arms 252 and 254 and the gusset plate 256 are made of steel, and are welded together. The one end of the arms 252 and 254 have apertures 260 and 262, respectively, located therein, and the other ends of arms 252 and 254 have apertures 264 and 266, respectively, located therein.

Referring next to FIG. 8, the linkage used to attach the snow plow of the present invention to the hitch frame nose piece 52 is illustrated. The components which are linked together are the plow A-frame 60, the lift bar 110, the bellcrank 230, and the lift link 250. Accordingly, reference may also be had to FIGS. 3, 4, 6, and 7 as well as to FIGS. 9 and 10 in the following description of the interconnection of these components. The lift bar 110 is pivotally mounted on the plow A-frame 60 using two pins 270 and 272 (the pin 270 is not shown in FIG. 8) which are each of a length longer than distance between the opposite-facing sides of the pairs of the hitch brackets 182 and 184, or 186 and 188 (illustrated in FIG. 5). The pins 270 and 272 are preferably made of steel.

In the preferred embodiment, a hollow cylindrical collar 274 (shown in FIGS. 9 and 10) having a setscrew 276 (also shown in FIGS. 9 and 10) is used with the pin 272 as a spacer. A similar collar with a setscrew (not shown in the drawings) is used with the pin 270 as a spacer. The collar 274 will be located intermediate the lug 68 on the plow A-frame 60 and the angled stock segment 130 on the lift bar 110. The setscrew 276 on the collar 274 may be used to lock the collar 274 in place on the pin 272. The other collar will be located intermediate the lug 66 on the plow A-frame 60 and the angled stock segment 128 on the lift bar 110, with a setscrew in that collar being used to lock that collar in place on the pin 270.

The pin 270 will thus extend sequentially through the aperture 158 in the rear mounting support 116 of the lift bar 110, the aperture 70 in the lug 66 of the plow A-frame 60, the collar, and the aperture 160 in the angled stock segment 128 of the lift bar 110. The pin 270 will be retained in place by the setscrew on the collar, which will contact the pin 270 when the setscrew is screwed into the collar. Approximately equal lengths of the pin 270 extend outwardly beyond the rear mounting support 116 and the angled stock segment 128 at each end of the pin 270. Alternately, the pin 270 may be welded in place on the rear mounting support 116 and the angled stock segment 128 of the lift bar 110, or C-clips (not shown herein) could be installed in annular groves (not shown herein) in the pin 270 at locations which correspond to the ends of the collar.

The pin 272 will thus extend sequentially through the aperture 162 in the angled stock segment 130 of the lift bar 110, the collar 274, the aperture 72 in the lug 68 of the plow A-frame 60, and the aperture 164 in the rear mounting support 118 of the lift bar 110. The pin 272 will be retained in place by the setscrew 276 on the collar 274, which will contact the pin 272 when it is screwed into the collar 274. Equal lengths of the pin 272 extend outwardly beyond the angled stock segment 130 and the rear mounting support 118 at each end of the pin 272. Alternately, the pin 272 may be welded in place on the angled stock segment 130 and the rear mounting support 118 of the lift bar 110, or C-clips (not shown herein) could be installed in annular groves (not shown herein) in the pin 272 at locations which correspond to the ends of the collar 274.

It will thus be appreciated by those skilled in the art that the lift bar 110 is pivotally mounted onto the plow A-frame 60 using the pins 270 and 272. When the snow plow of the present invention is mounted onto a vehicle using the hitch frame nose piece 52, the ends of the pins 270 and 272 will be received in the pairs of slots 206 and 208, and 210 and 212 in the hitch frame nose piece 52 (illustrated in FIG. 5). Thus, the pins 270 and 272 function both to pivotally mount the lift bar 110 onto the plow A-frame 60, and to help to mount the snow plow onto the hitch frame nose piece 52.

The bellcrank 230 is pivotally mounted on the plow A-frame 60 using two bolts 278 and two nuts 280. The pivot plates 232 and 234 of the bellcrank 230 will fit outside of the pivot mount plates 94 and 96, respectively. One of the bolts 278 will extend through the aperture 98 in the pivot mount plate 94 of the plow A-frame 60 and the aperture 238 in the pivot plate 232 of the bellcrank 230, and one of the nuts 280 will be mounted on that bolt 278 to retain it in place. The other one of the bolts 278 will extend through the aperture 100 in the pivot mount plate 96 of the plow A-frame 60 and the aperture 240 in the pivot plate 234 of the bellcrank 230, and the other one of the nuts 280 will be mounted on that bolt 278 to retain it in place.

The bolts 278 allow the bellcrank 230 to pivot on the plow A-frame 60. In the preferred embodiment, a spacer and two washers (not shown) may be used with each of the bolts 278, the spacer going through the apertures in the parts being pivotally joined and being longer than the combined thickness of the apertures in the parts, and a washer being located on either end of the spacer to facilitate free rotation of parts, here movement of the bellcrank 230 with reference to the plow A-frame 60. It will be understood by those skilled in the art that a spacer and two washers will preferably be used at other points of relative movement between two elements of linkage of the snow plow described herein, although the spacer and two washers will not be specifically mentioned in conjunction with each of these pivoting connections made between two elements using a bolt. In addition, it will be understood by those skilled in the art that a pin retained by a cotter pin (not shown herein) could be used instead of a bolt and nut in many of the applications for a fastener used in the linkage discussed herein.

A hydraulic cylinder 282 is mounted at one end to the lift cylinder mounts 78 and 80 of the plow A-frame 60 using a bolt 284 which extends through the aperture 90 in the lift cylinder mount 78 and the aperture 92 in the lift cylinder mount 80, with a nut 286 being used to retain the bolt 284 in place. The other end of the hydraulic cylinder 282 drives the third corner of the triangular pivot plates 232 and 234 of the bellcrank 230, with a bolt 288 extending between the aperture 246 in the pivot plate 232 of the bellcrank 230 and the aperture 248 in the pivot plate 234 of the bellcrank 230. A nut 290 is used to retain the bolt 288 in place. The bolts 282 and 288 allow the hydraulic cylinder 282 to move as it drives the bellcrank 230. Spacers (not shown herein) may be used on each side of the other end of the hydraulic cylinder 282 on the insides of the pivot plates 232 and 234 to center the hydraulic cylinder 282.

The lift link 250 is used to connect the bellcrank 230 to pivot the lift bar 110. A bolt 292 is used to connect the lift link 250 to the lift bar 110, with the bolt 292 extending sequentially through the aperture 264 in the arm 252 of the lift link 250, the upper pin 152 from the end extending through the upper pin hanger plate 144 to the end extending through the upper pin hanger plate 146 of the lift bar 110, and the aperture 266 in the arm 254 of the lift link 250. A nut 294 is used to retain the bolt 292 in place. The bolt 292 allows the lift link 250 to pivot on the lift bar 110, and a spacer and two washers may also be used as mentioned hereinabove.

The second corner of the triangle formed by the pivot plates 232 and 234 of the bellcrank 230 drives the ends of the arms 252 and 254 of the lift link 250 which are not connected to the lift bar 110. Two bolts 296 are used to connect the bellcrank 230 to the lift link 250, with one of the bolts 296 also being used to mount a stand 298. The stand 298 is described in U.S. Pat. No. 5,894,688, to Struck et al., which patent is assigned to the assignee of the inventions described herein. U.S. Pat. No. 5,894,688 is hereby incorporated herein by reference.

One bolt 296 (not shown) extends through the aperture 260 in the arm 252 of the lift link 250 and the aperture 242 of the pivot plate 232 of the bellcrank 230, with a nut 300 (not shown) being used to retain the first bolt 296 in place, and a spacer and two washers may also be used as mentioned hereinabove. The other bolt 296 extends sequentially through an aperture (not shown) in the upper portion of the stand 298, the aperture 244 of the pivot plate 234 of the bellcrank 230, and the aperture 262 in the arm 254 of the lift link 250, with a nut 300 being used to retain the second bolt 296 in place. The second bolt 296 allows the lift link 250 to pivot on the bellcrank 230, and a spacer and two washers may again be used as mentioned hereinabove. A removable pin (not shown) extending through an aperture near the top of the stand 298 and apertures located in the lift link 250 is used to link the stand 298 with the lift link 250.

The hydraulic cylinder 282 is shown in FIG. 8 nearly in its fully retracted position. When the hydraulic cylinder 282 is fully extended, it will be appreciated by those skilled in the art that the lift bar 110 will rotate counterclockwise from the position in which it is shown in FIG. 8, and the stand 298 will be lowered to engage the ground (not shown) and thereby tend to lift the rear end of the plow A-frame 60 upwardly. It will also be appreciated that once the pins 270 and 272 are in engagement with the slots 206, 208, 210, and 212 in the hitch brackets 182, 184, 186, and 188, respectively, of the hitch frame nose piece 52, the hydraulic cylinder 282 may be used to align the apertures 166, 168, 170, and 172 on the lift bar 110 with the apertures 214, 216, 218, and 220, respectively, in the hitch brackets 182, 184, 186, and 188, respectively, of the hitch frame nose piece 52.

Figure 11:
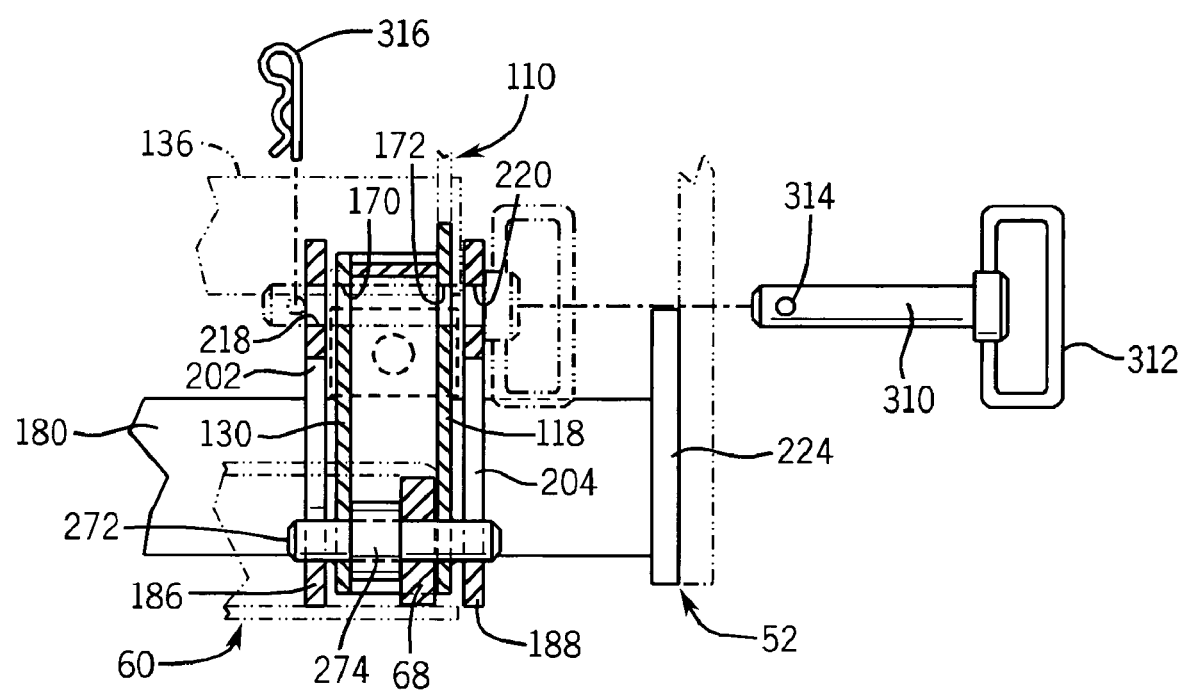
FIG. 11 is a partial cross-sectional view from the front showing the components illustrated in FIGS. 9 and 10 in a mounted position with the retaining pin inserted.

Referring now to FIGS. 9 through 15, the operation of the mounting system used to mount the snow plow on the hitch frame nose piece 52 is shown. Referring first to FIGS. 9 through 11, in conjunction with FIGS. 3, 4, 5, and 8, the mechanism used to connect the snow plow to the hitch frame nose piece 52 is shown. In the discussion herein, all references are to the left side of the snow plow and the hitch frame nose piece 52, but those skilled in the art will understand that the principles thereof are equally applicable to the right side of the snow plow and the hitch frame nose piece 52.

The snow plow is mounted onto the hitch frame nose piece 52 with the plow standing on the stand 298 (shown in FIG. 12). In this position, the pin 272 which extends laterally at the rear of the snow plow on the left side will be at a height such than when the truck having the hitch frame nose piece 52 mounted thereon moves forward, the pin 272 will fit into the rectangular notches 202 and 204 at the front of the hitch brackets 186 and 188, respectively. The pin 272 is brought fully into the rectangular notches 202 and 204 by moving the truck forward. It will be noted that the approximately seventy degree bend in the angled stock segment 130 will assist in guiding the rear mounting support 118 and the angled stock segment 130 of the lift bar 110 into position intermediate the hitch bracket 186 and 188.

At this point, the hydraulic cylinder 282 (shown in FIG. 8) is actuated to begin to retract it to raise the stand 298 (also shown in FIG. 8), causing the pin 272 to drop into the slots 210 and 212 in the hitch brackets 186 and 188, respectively. By continuing to actuate the hydraulic cylinder 282 to retract it, the lift bar 110 is pivoted to bring the apertures 170 and 172 in the angled stock segment 130 and the rear mounting support 118, respectively, of the lift bar 110 into alignment with the apertures 218 and 220 in the hitch brackets 186 and 188, respectively, of the hitch frame nose piece 52. At this point, a retaining pin 310 having a handle 312 may be inserted sequentially through the aperture 220 in the hitch bracket 188, the aperture 172 in the rear mounting support 118, the aperture 170 in the angled stock segment 130, and the aperture 218 in the hitch bracket 186. The retaining pin 310 has an aperture 314 extending therethrough near the distal end thereof, and a retaining spring pin 316 is used to retain the retaining pin 310 in place.

Referring next to FIGS. 12 through 15, the installation of the snow plow onto the hitch frame nose piece 52 mounted on the truck 54 (shown in phantom lines in FIG. 15) is illustrated. In FIG. 12, the snow plow is shown in its stored position, supported on the stand 298. In this position, the hydraulic cylinder 282 is in its fully extended position, and the rear end of the snow plow is raised. In this position, the pin 270 (not shown in FIGS. 12 through 15) at the right rear of the snow plow will be received by the rectangular notches 198 and 200 (not shown in FIGS. 12 through 15) at the front of the hitch brackets 182 and 184 (not shown in FIGS. 12 through 15), respectively, at the right side of the hitch frame nose piece 52. Similarly, the pin 272 at the left rear of the snow plow will be received by the rectangular notches 202 (not shown in FIGS. 12 through 15) and 204 at the front of the hitch brackets 186 (not shown in FIGS. 12 through 15) and 188, respectively, at the left side of the hitch frame nose piece 52. The truck 54 may be driven forward to fully engage the pins 270 and 272 with the hitch frame nose piece 52 as shown in FIG. 12.

Next, as shown in FIG. 14, as the hydraulic cylinder 282 begins to retract, the plow A-frame 50 will lower at the rear end thereof as the stand 298 begins to move upwardly relative to the plow A-frame 50. This causes the pin 270 (not shown in FIGS. 12 through 15) to drop into the slots 206 and 208 (not shown in FIG. 14) in the hitch brackets 182 and 184 (not shown in FIG. 14), respectively, at the right side of the hitch frame nose piece 52. Similarly, the pin 272 drops into the slots 210 (not shown in FIG. 14) and 212 in the hitch brackets 186 (not shown in FIG. 14) and 188, respectively, at the left side of the hitch frame nose piece 52. This initial retraction of the hydraulic cylinder 282 also causes the lift bar 110 to begin to rotate clockwise as viewed from the left side of the snow plow, as is evident from the movement of the right light support tower 320 (not shown in FIG. 14, but which is mounted on the front light bar support 124, also not shown in FIG. 14) the left light support tower 322 (which is mounted on the front light bar support 126), and the light support bar 324, which is mounted on the light support towers 320 and 322.

Figure 15:
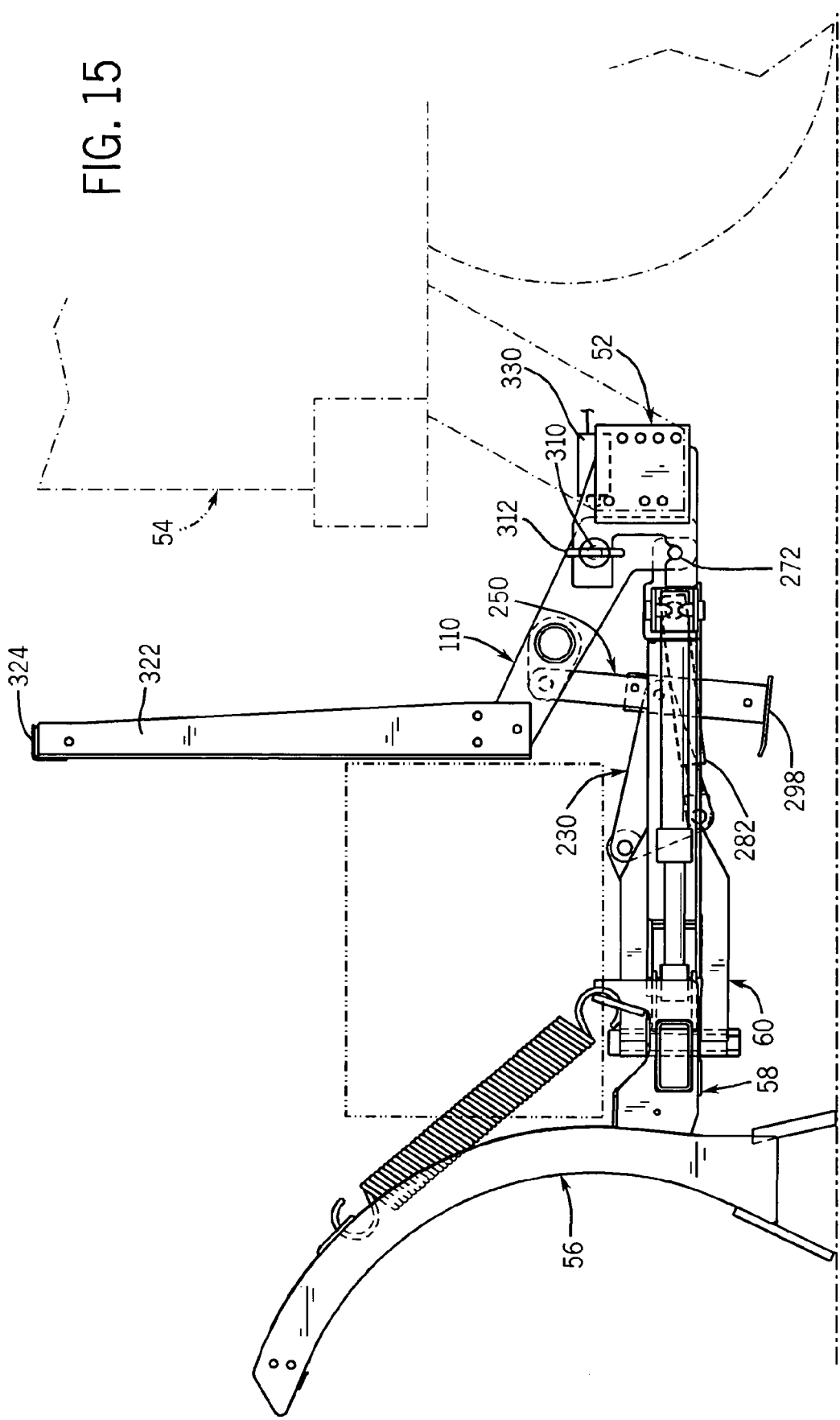
FIG. 15 is a side view similar to that of FIGS. 12 and 14, with the pivoting lift bar pivoted to bring the mounting holes in the pivoting lift bar into alignment with the mounting holes in the hitch frame nose piece.

As shown in FIG. 15, as the hydraulic cylinder 282 continues to retract, the lift bar 110 rotates clockwise until the light support towers 320 and 322 are oriented nearly vertically. As this further rotation occurs, the pin 270 (not shown in FIG. 15) remains in the slots 206 and 208 in the hitch brackets 182 and 184, respectively (none of which are shown in FIG. 15). Similarly, the pin 272 remains in the slots 210 (not shown in FIG. 15) and 212 in the hitch brackets 186 (not shown in FIG. 15) and 188, respectively. On the right side of the lift bar 110 and the hitch frame nose piece 52 (best shown in FIGS. 4 and 5), the apertures 166 and 168 in the rear mounting support 116 and the angled stock segment 128, respectively, of the lift bar 110 move into engagement with the apertures 214 and 216 in the hitch brackets 182 and 184, respectively, of the hitch frame nose piece 52. Likewise, on the left side of the lift bar 110 and the hitch frame nose piece 52 (portions of which are also best shown in FIGS. 4 and 5, respectively), the apertures 170 and 172 in the angled stock segment 130 and the rear mounting support 118, respectively, of the lift bar 110 move into alignment with the apertures 218 and 220 in the hitch brackets 186 and 188, respectively, of the hitch frame nose piece 52.

At this point, one of the retaining pins 310 is inserted sequentially through the aperture 214 in the hitch bracket 182, the aperture 166 in the rear mounting support 116, the aperture 168 in the angled stock segment 128, and the aperture 216 in the hitch bracket 184 (all of which are best shown in FIGS. 4 and 5). The other one of the retaining pins 310 is inserted sequentially through the aperture 220 in the hitch bracket 188, the aperture 172 in the rear mounting support 118, the aperture 170 in the angled stock segment 130, and the aperture 218 in the hitch bracket 186 (many of which are also best shown in FIGS. 4 and 5). The retaining spring pins 316 are then inserted into the apertures 314 near the distal ends of the retaining pins 310 to retain the retaining pins 310 in place. At this point, the stand 298 may also be moved to a stowed position by disconnecting it from the lift link 250 (by removal of a pin (not shown)) and rotating it to the stowed position as is taught in U.S. Pat. No. 5,894,688, which was incorporated by reference above.

Turning next to FIG. 16, the front side of the hitch frame nose piece 52 is shown as it is mounted under the front bumper 53 of a truck 54. Located on top of the square hitch frame tube 180 of the hitch frame nose piece 52 between the hitch brackets 186 and 188 is a video camera 330, which has a lens 332 located on the front side thereof and a wiring harness 334 extending from the rear end thereof. The video camera 330 and the lens 332 of the video camera 330 are preferably located in a sealed enclosure to protect them from the elements. It may be seen that the video camera 330 is situated on top of the square hitch frame tube 180 and between the hitch brackets 186 and 188 near the left side of the hitch frame nose piece 52 in order to protect the video camera 330.

The video camera 330 may be mounted onto the hitch frame nose piece 52 using brackets (not shown) mounted to the hitch frame nose piece 52, or it may be mounted directly to the hitch bracket 186, the hitch bracket 188, and/or the hitch frame nose piece 52 using either well-known hardware or a strong, durable, water-resistant adhesive. Note that the video camera 330 could alternatively have been located between the hitch brackets 182 and 184 near the right side of the hitch frame nose piece 52 to similarly protect it from harm and damage.

The lens 332 of the video camera 330 is oriented forwardly from the front of the truck 54 so as to capture a video representation of the area located directly in front of the video camera 330 as it is mounted on the square hitch frame tube 180 of the hitch frame nose piece 52. The video camera 330 is mounted on the square hitch frame tube 180 in a level fashion, thereby assuring that the video picture captured by the video camera 330 will be centered on the area at the same level in front of the truck 54. The video camera 330 is powered by the wiring harness 334, which in the preferred embodiment is also used to carry the video signal generated by the video camera 330 to the rest of the video camera facilitated hitch alignment system of the present invention. The video camera 330 is also shown in its position as mounted on the square hitch frame tube 180 of the hitch frame nose piece 52 in FIGS. 1, 2, 5, 8–10, 12, 14, and 15.

Turning now to FIG. 17, the rear side of the lift bar 110 is shown as it is mounted on the plow A-frame 60 and the rest of the snow plow assembly 50. This would be the view as seen from the front of a truck 54 (not shown in FIG. 17) as it approaches the snow plow assembly 50 to mount the snow plow assembly 50 onto the truck 54. Located on the rear-facing side of the segment of angled stock 130 located on the left side of the lift bar 110 is an alignment mark 340 which is in a color which provides a high degree of contrast to the surface color of the segment of angled stock 130. Since snow plow carriages are typically coated with a black enamel, the alignment mark 340 may be in a highly reflective white paint on the black enamel on the segment of angled stock 130 of the lift bar 110, thereby ensuring a high degree of visibility for the alignment mark 340.

In the preferred embodiment shown, the alignment mark 340 has both a vertical line and a horizontal line, with an angles line as well and with all three lines intersecting at a single point. This intersection point of the alignment mark 340 is located on the segment of angled stock 130 of the lift bar 110 such that it will be at the height of the center of the lens 332 of the video camera 330 (shown in FIG. 16) when the snow plow assembly 50 is brought into alignment with the hitch frame nose piece 52 on the truck 54 (both shown in FIG. 16). Since the video camera 330 is mounted on the hitch frame nose piece 52 with the lens 332 of the video camera 330 oriented to face directly forward, it will be able to "see" the alignment mark 340 on the segment of angled stock 130 of the lift bar 110 as the truck 54 approaches the snow plow assembly 50, thereby guiding the alignment of the truck 54 with the snow plow assembly 50.

Turning next to FIG. 18, the cab or passenger compartment of the truck 54 is shown from the perspective of the driver's door. A video monitor assembly 350 is mounted on the dash 352 in a position that will not interfere substantially with the driver's view. The video monitor assembly 350 shown in FIG. 18 is a small cathode ray tube-based monitor, although an LCD monitor could be used instead. In addition, the video monitor assembly 350 could be mounted in the dash 352 rather than on it. Note that the wiring harness 334 is also connected to the video monitor assembly 350, both to power it and to provide the video from the alignment mark 340 (shown in FIG. 16) to the video monitor assembly 350 for display thereupon.

The video monitor assembly 350 includes a video display screen 354 which is sufficiently large to be clearly seen by the driver of the truck 54, typically at least five inches measured diagonally. If the truck 54 has a satellite navigation or other electronic system with an LCD display (not shown), that display could be used instead of having a discrete dedicated monitor. The sole requirement is that the video monitor assembly 350 be located in a position where the video display screen 354 will be useful to the driver of the truck 54 in bringing the truck 54 into position with regard to the snow plow assembly 50 (shown in FIG. 17) to align the snow plow assembly 50 with the hitch frame nose piece 52 (also shown in FIG. 17) on the front of the truck 54.

Referring now to FIG. 19, a preferred embodiment of the video camera-facilitated hitch alignment system of the present invention is schematically illustrated. The video camera 330 includes a video sensor 360 which has an image focussed thereupon by the lens 332 of the video camera 330. Thus, if the lens 332 of the video camera 330 is oriented toward the alignment mark 340, the image of the alignment mark 340 will be focussed by the lens 332 of the video camera 330 onto the video sensor 360, which will capture the image and convert it to a video signal.

A power source 362 is connected via the wiring harness 334 to a switch 364 contained in the video monitor assembly 350. When the switch 364 is turned on, it will supply power from the power source 362 to the video display screen 354 contained in the video monitor assembly 350, as well as to the video sensor 360 via the wiring harness 334. When the video sensor 360 and the video display screen 354 are powered, a video signal will be provided from the video sensor 360 and displayed on the video display screen 354. Thus, the image of the alignment mark 340 that is captured by the video sensor 360 will be displayed on the video display screen 354.

Referring next to FIG. 20, an alternate embodiment of the video camera-facilitated hitch alignment system of the present invention is schematically illustrated. In this alternate embodiment, the video camera 330 operates to wirelessly transmit video signals to the video monitor assembly 350. As in FIG. 19, the video camera 330 includes a video sensor 370 which has an image focussed thereupon by the lens 332 of the video camera 330. Again, if the lens 332 of the video camera 330 is oriented toward the alignment mark 340, the image of the alignment mark 340 will be focussed by the lens 332 of the video camera 330 onto the video sensor 370, which will capture the image and convert it to a video signal.

The video camera 330 is powered by a self-contained battery 372, which supplies power to a receiver 374 which is always on. The receiver 374 is used to operate a switch 376 to cause it to supply power to the video sensor 370 and to a transmitter 378. The receiver 374 operates at very low power, and receives a signal sent from the video monitor assembly 350 that indicates that the video camera 330 is to be turned on. When the switch 376 provides power to the video sensor 370, it will produce a video signal and supply it to the transmitter 378, which will transmit the video signal to the video monitor assembly 350.

A power source 380 is connected via the wiring harness 334 to a switch 382 contained in the video monitor assembly 350. When the switch 382 is turned on, it will supply power from the power source 380 to the video display screen 354 contained in the video monitor assembly 350, as well as to a transmitter 384 and a receiver 386. When the transmitter 384 is supplied with power, it will transmit a signal to the video camera 330, which signal is received by the receiver 374 and causes the switch 376 to supply power to the video sensor 370 and the transmitter 378, as mentioned above.

When the receiver 386 and the video display screen 354 are powered, a video signal will be received by the receiver 386 and displayed on the video display screen 354. Thus, the image of the alignment mark 340 which is captured by the video sensor 370 will be transmitted by the transmitter 378, received by the receiver 386, and displayed on the video display screen 354. It will be appreciated that in this alternate embodiment, the video camera 330 may be remotely mounted on the hitch frame nose piece 52 (shown in FIG. 16) without being connected to the wiring harness 334. Remote video cameras and transmitters that are commercially available will operate for an entire winter season on a single internal battery.

In a variation of this alternate embodiment, a remote (wireless) video camera 390 may be mounted on the snow plow assembly 50 instead of on the hitch frame nose piece 52 or on the front bumper 53 of the truck 54. The remote video camera 390 is shown in phantom lines in FIG. 2 to be mounted on the lift bar 110, but it may instead be mounted on any location on the snow plow assembly 50 which is sufficiently protected from impact which could damage the remote video camera 390. In this case, a target indicia may be located on the hitch frame nose piece 52 or on the front bumper 53 of the truck 54, or a target indicia may not be utilized. As long as the truck 54 is located sufficiently close to the snow plow assembly 50, receiving the transmitted signal from the remote video camera 390 will be possible.

In another alternate embodiment, a video camera 392 (either wireless or wired) may be mounted on the truck 54 and oriented to display both the hitch frame nose piece 52 and the snow plow assembly 50 as the truck 54 approaches the snow plow assembly 50. In FIG. 16, the video camera 392 is shown in phantom lines as being mounted on the front bumper 53, from which location it will look out over the nose piece 52 and will view the snow plow assembly 50 as the truck 54 approaches the snow plow assembly 50. Other locations on the truck 54 may also be utilized, with the video camera 392 being downwardly oriented if it is mounted at a higher location than the underside of the bumper 53 of the truck 54.

In yet another variation upon the preferred embodiment or any of the alternate embodiments mentioned above, a distance sensor 396 may be used to determine the distance between the truck 54 or the hitch frame nose piece 52 and the snow plow assembly 50. In FIG. 16, the distance sensor 396 is shown in phantom lines as being located on the housing of the video camera 330. The distance sensor 396 could instead be mounted on the truck 54, the bumper 53 of the truck 54, or on the hitch frame nose piece 52. The distance sensor 396 is preferably both a transmitter and a receiver, and may use infrared communication technology or radio frequency (RF) communication technology such as ultrasonic waves, and may be used to derive a distance (feet and inches) which the snow plow assembly 50 is away from the hitch frame nose piece 52. This distance may be displayed on the video display screen 354.

Moving now to FIGS. 21 through 23, a series of top plan views depict a truck 54 having the hitch frame nose piece 52 and the video camera 330 mounted under the front bumper 53 thereof and the video monitor assembly 350 located in the cab thereof as it approaches the snow plow assembly 50, with the image on the video display screen 354 of the video monitor assembly 350 being shown in an enlarged inset view. The truck 54 moves progressively closer to the snow plow assembly 50, moving from some distance away in FIG. 21, to a closer location to the snow plow assembly 50 in FIG. 22, to a location proximate the snow plow assembly 50 in FIG. 23.

By maneuvering the truck 54 as it approaches the snow plow assembly 50 to maintain the alignment mark 340 on the segment of angled stock 130 of the lift bar 110 at the center of the video display screen 354, the hitch frame nose piece 52 will be exactly aligned with the snow plow assembly 50. The hitch latching procedure described above in conjunction with FIGS. 12, 14, and 15 may then be followed to mount the snow plow assembly 50 onto the hitch frame nose piece 52, which is mounted on the truck 54 under the front bumper 53 thereof. This process is easy, quick, and convenient, and may be accomplished by a single person by driving the truck 54 into a position in which the hitch latching operation may be performed, and then getting out of the truck and latching the snow plow assembly 50 onto the hitch frame nose piece 52 and the truck 54.

Referring finally to FIG. 24, an alternate embodiment illustrating a different use of the video camera facilitated hitch alignment system of the present invention is shown. In this embodiment, a truck 400 having a trailer hitch 402 located at the rear thereof as is conventional is illustrated. The truck 400 will be used to pull a trailer 404, here a boat trailer although this embodiment is equally applicable to any type of trailer. The trailer 404 has a hitching mechanism 406 located to the front end thereof, as is conventional.

Also located on the rear of the truck 400 to the side of the trailer hitch 402 is a video camera 408, which has a lens 410 located on the rear side thereof and a extending from the front end thereof. The video camera 408 may be mounted on the rear bumper of the truck 400, preferably in a location which will protect the video camera 408. The lens 410 of the video camera 408 is oriented rearwardly from the rear of the truck 400 so as to capture a video representation of the area located directly behind the video camera 408 as it is mounted on the truck 400.

The video camera 408 is mounted on the rear bumper of the truck 400 in a level fashion, thereby assuring that the video picture captured by the video camera 408 will be centered on the area at the same level behind the truck 400. The video camera 408 is powered by the wiring harness 412, which may be used to carry the video signal generated by the video camera 408 to the rest of the video camera facilitated hitch alignment system of the present invention. Optimally, the video camera 408 is mounted relatively close to the trailer hitch 402.

Located on the side of the front end of the trailer 404 relatively close to the hitching mechanism 406 at the front thereof is an outwardly-extending projection 414 which located on same side of the front end of the trailer 404 as the video camera 408 is located with respect to the trailer hitch 402 on the truck 400. Located on the front side of the projection 414 is an alignment mark 416 (shown in the video display in FIG. 24). The alignment mark 416 which is in a color which provides a high degree of contrast to the surface color of the projection 414, such as a highly reflective white paint with black enamel on the projection 414, thereby ensuring a high degree of visibility for the alignment mark 416.

The alignment mark 416 has both a vertical line and a horizontal line, with an angles line as well and with all three lines intersecting at a single point. This intersection point of the alignment mark 416 is located on the projection such that it will be at the height of the center of the lens 410 of the video camera 408 when the trailer hitch 402 is brought into alignment with the hitching mechanism 406 (although the trailer hitch 402 will be under the hitching mechanism 406 to allow the hitching operation to be performed). Since the video camera 408 is mounted on the rear bumper of the truck 400 with the lens 410 of the video camera 408 oriented to face directly rearwardly, it will be able to "see" the alignment mark 416 on the projection 414 as the truck 400 approaches the trailer 404, thereby guiding the alignment of the trailer hitch 402 on the truck 400 with the hitching mechanism 406 on the trailer 404.

A video monitor assembly 418 is mounted on the dash 420 in the cab of the truck 400 in a position which will not interfere substantially with the driver's view. The wiring harness 412 is also connected to the video monitor assembly 418, both to power it and to provide the video from the alignment mark 416 (shown in the inset view of the video monitor assembly 418). The video monitor assembly 418 be located in a position where a video display screen 422 contained in the video monitor assembly 418 will be useful to the driver of the truck 400 in bringing the truck 400 into position with regard to the trailer 404 to align the trailer hitch 402 on the truck 400 with the hitching mechanism 406 on the trailer 404.

It may therefore be appreciated from the above detailed description of the preferred embodiment of the present invention that it teaches a video camera facilitated hitch alignment system which may be used to guide the driver of a truck in the approach to a snow plow to bring the hitch mounting mechanism components on the truck into alignment with the mating hitch mounting mechanism components on the snow plow. The video camera facilitated hitch alignment system of the present invention is operable by a single person, namely the driver of the truck. The driver of a truck using the video camera facilitated hitch alignment system of the present invention never need leave the cab of the truck to guide the truck from a distance well away from the snow plow as it approaches and moves into alignment and engagement with the snow plow.

The video camera facilitated hitch alignment system of the present invention is relatively easy to install onto a truck and a snow plow. The video camera facilitated hitch alignment system of the present invention is both vehicle independent and snow plow independent, so that it may be installed on any vehicle and used with any type of mounting arrangement for any snow plow or other implement. The video camera facilitated hitch alignment system of the present invention is also simple to operate and use, and it requires little or no training to operate.

The video camera facilitated hitch alignment system of the present invention is of a construction which is both durable and long lasting, and which will require little or no maintenance to be provided by the user throughout its operating lifetime. The video camera facilitated hitch alignment system of the present invention is also of inexpensive construction to enhance its market appeal and to thereby afford it the broadest possible market. Finally, all of the aforesaid advantages and objectives of the video camera facilitated hitch alignment system of the present invention are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A system for facilitating the alignment of a hitching mechanism located on a vehicle with a mating hitching mechanism located on an object to be removably connected to the vehicle, said system comprising:

a target area located on the object to be removably connected to the vehicle, said target area having an alignment indicia located thereupon, said target area facing the vehicle when the object to be removably connected to the vehicle is in position for connection to the vehicle;

a video camera for installation in a fixed position on the vehicle, said video camera being oriented with a lens of said video camera facing toward said alignment indicia located on said target area, directly in a generally straight and level manner at substantially the same height with respect to ground as is the alignment indicia when the object to be removably connected to the vehicle is in position for connection to the vehicle; and a video monitor for placement in the passenger compartment of said vehicle in a position in which it may be viewed by a driver of the vehicle, said video monitor for displaying thereon an image viewed by said video camera, wherein the hitching mechanism located on the vehicle is mounted at the front of the vehicle and wherein the object to be removably connected to the vehicle is an implement.

2. A system as defined in claim 1, wherein said target area comprises:

a surface located on the object to be removably connected to the vehicle, said surface facing said vehicle when the object to be removably connected to the vehicle is in position for connection to the vehicle; and said alignment indicia located on said surface in a position in which said alignment indicia will be at the center of said image when the object to be removably connected to the vehicle is in position for connection to the vehicle.

3. A system as defined in claim 2, wherein said alignment indicia comprises:
at least two intersecting lines, the intersection between said at least two intersecting lines being at the center of said image when the object to be removably connected to the vehicle is in position for connection to the vehicle.

4. A system as defined in claim 2, wherein said alignment indicia is of a color which offers a high degree of contrast with a color of said surface located on the object to be removably connected to the vehicle.

5. A system as defined in claim 2, wherein said surface is located on the object to be removably connected to the vehicle in a position which will be near to said video camera when the object to be removably connected to the vehicle is in position for connection to the vehicle.

6. A system as defined in claim 1, wherein said video camera is hermetically sealed to protect it from the elements.

7. A system as defined in claim 1, additionally comprising:
a wiring harness, said wiring harness connecting said video camera to said video monitor, said wiring harness also connecting both said video camera and said video monitor to a source of power.

8. A system as defined in claim 1, wherein said video camera comprises:
a wireless transmitter for transmitting video signals;
and wherein said video monitor comprises:
a wireless receiver for receiving said video signals from said wireless transmitter.

9. A system as defined in claim 8, wherein said video monitor additionally comprises:
a wireless transmitter for sending a signal to turn on said video camera;
and wherein said video camera additionally comprises:
a wireless receiver for receiving said signal to turn on said video camera.

10. A system as defined in claim 8, wherein said video camera additionally comprises:
a battery for supplying power to said video camera.

11. A system as defined in claim 1, wherein said video monitor is mounted on or in a dash located in said passenger compartment of said vehicle.

12. A system as defined in claim 1, wherein said video monitor comprises either a CRT display or an LCD video display.

13. A system for facilitating the alignment of a hitching mechanism located on a vehicle with a mating hitching mechanism located on an object to be removably connected to the vehicle, said system comprising:
a target area located on the object to be removably connected to the vehicle, said target area facing the vehicle when the object to be removably connected to the vehicle is in position for connection to the vehicle;
a video camera for installation in a fixed position on the vehicle, said video camera being oriented toward said target area on the object to be removably connected to the vehicle when the object to be removably connected to the vehicle is in position for connection to the vehicle; and
a video monitor for placement in the passenger compartment of said vehicle in a position in which it may be viewed by a driver of the vehicle, said video monitor for displaying thereon an image viewed by said video camera,
wherein the hitching mechanism located on the vehicle is mounted at the front of the vehicle, and wherein the object to be removably connected to the vehicle is an implement.

14. A system as defined in claim 13, wherein said implement comprises: a snow plow.

15. A system as defined in claim 14, wherein the hitching mechanism located on the vehicle comprises:
a hitch frame nose piece that is mounted at the front of the vehicle; and wherein said target area is located on said snow plow.

16. A system as defined in claim 15, wherein said video camera is mounted on said hitch frame nose piece.

17. A system as defined in claim 15, wherein said target area is located on the hitching mechanism on said snow plow.

18. A system as defined in claim 1, wherein the hitching mechanism located on the vehicle comprises:
a trailer hitch which is mounted at the rear of the vehicle; wherein the object to be removably connected to the vehicle comprises:
a trailer, wherein said target area is located on said trailer.

19. A system as defined in claim 18, wherein said video camera is mounted close adjacent to said trailer hitch.

20. A system as defined in claim 19, wherein said hitching mechanism on said trailer is located at the front end thereof, and wherein said target area is located near the front end of the trailer relatively close to the hitching mechanism at the front thereof.

21. A system as defined in claim 1, additionally comprising:
a sensor for sensing the distance between the object to be removably connected to the vehicle and the vehicle;
wherein the distance between the object to be removably connected to the vehicle and the vehicle is displayed on said video monitor.

22. A system as defined in claim 21, wherein said distance sensor comprises:
a transmitter of a communication wave; and
a receiver of reflections of said transmitted wave.

23. A system as defined in claim 22, wherein said communications medium is infrared waves.

24. A system as defined in claim 22, wherein said communications medium is ultrasonic radio frequency (RF) waves.

25. A system for facilitating the alignment of a hitching mechanism located on a vehicle with a mating hitching mechanism located on an object to be removably connected to the vehicle, said system comprising:
a video camera for installation in a fixed position on one of the vehicle and the object to be removably connected to the vehicle;
a target area located on the other of the vehicle and the object to be removably connected to the vehicle, said target area having an alignment indicia located thereupon, said target area facing one of the vehicle and the object to be removably connected to the vehicle when the object to be removably connected to the vehicle is in position for connection to the vehicle, said video camera being oriented with a lens of said video camera facing toward said alignment indicia on said target area, directly in a generally straight and level manner at substantially the same height with respect to ground as is the alignment indicia when the object to be removably connected to the vehicle is in position for connection to the vehicle, wherein the hitching mechanism located on the vehicle is mounted at the front of the vehicle and wherein the object to be removably connected to the vehicle is an implement; and a video monitor for placement in the passenger compartment of said vehicle in a position in which it may be viewed by a driver of the vehicle, said video monitor for displaying thereon an image viewed by said video camera.

26. A method of facilitating the alignment of a hitching mechanism located on a vehicle with a mating hitching mechanism located on an object to be removably connected to the vehicle, said method comprising:

providing a target area on the object to be removably connected to the vehicle, said target area facing the vehicle when the object to be removably connected to the vehicle is in position for connection to the vehicle, wherein the hitching mechanism located on the vehicle is mounted at the front of the vehicle and wherein the object to be removably connected to the vehicle is an implement;

providing an alignment indicia on said target area;

installing a video camera in a fixed position on the vehicle, orienting said video camera with a lens of said video camera facing the alignment indicia on said target area, directly in a generally straight and level manner at substantially the same height with respect to ground as is the alignment indicia when the object is in position for connection to the vehicle; and displaying an image viewed by said video camera on a video monitor located in the passenger compartment of said vehicle in a position in which it may be viewed by a driver of the vehicle.

27. A system for facilitating the alignment of a hitching mechanism located on a vehicle with a mating hitching mechanism located on an object to be removably connected to the vehicle, said system comprising:

a target area located on the object to be removably connected to the vehicle, said target area facing the vehicle when the object to be removably connected to the vehicle is in position for connection to the vehicle;

a video camera for installation in a fixed position on the vehicle, said video camera being oriented toward said target area on the object to be removably connected to the vehicle when the object to be removably connected to the vehicle is in position for connection to the vehicle, said video camera including a wireless transmitter for transmitting video signals; and a video monitor for placement in the passenger compartment of said vehicle in a position in which it may be viewed by a driver of the vehicle, said video monitor for displaying thereon an image viewed by said video camera, said video monitor including a wireless receiver for receiving said video signals from said wireless transmitter, wherein the hitching mechanism located on the vehicle is mounted at the front of the vehicle and wherein the object to be removably connected to the vehicle is an implement.

28. A system as defined in claim 27, wherein said video monitor additionally comprises:

a wireless transmitter for sending a signal to turn on said video camera;

and wherein said video camera additionally comprises:

a wireless receiver for receiving said signal to turn on said video camera.

* * * * *